(12) United States Patent
Ardes

(10) Patent No.: US 9,023,203 B2
(45) Date of Patent: May 5, 2015

(54) LIQUID FILTER

(75) Inventor: Wilhelm Ardes, Ascheberg (DE)

(73) Assignee: Hengst SE & Co., KG, Muenster (DE)

( * ) Notice: Subject to any disclaimer, the term of this patent is extended or adjusted under 35 U.S.C. 154(b) by 366 days.

(21) Appl. No.: 13/513,965

(22) PCT Filed: Dec. 7, 2010

(86) PCT No.: PCT/EP2010/069067
§ 371 (c)(1),
(2), (4) Date: Jun. 5, 2012

(87) PCT Pub. No.: WO2011/070011
PCT Pub. Date: Jun. 16, 2011

(65) Prior Publication Data
US 2012/0267293 A1 Oct. 25, 2012

(30) Foreign Application Priority Data
Dec. 10, 2009 (DE) .......................... 10 2009 054 523

(51) Int. Cl.
*B01D 35/30* (2006.01)
*B01D 29/11* (2006.01)
*B01D 29/15* (2006.01)
*B01D 29/88* (2006.01)
*B01D 35/147* (2006.01)
*F02M 37/22* (2006.01)

(52) U.S. Cl.
CPC ...... B01D 35/147 (2013.01); *B01D 2201/0415* (2013.01); *B01D 2201/291* (2013.01); *B01D 2201/305* (2013.01); *B01D 2201/316* (2013.01); *B01D 2201/4007* (2013.01)

(58) Field of Classification Search
CPC .... B01D 27/14; B01D 27/146; B01D 27/148; B01D 29/0052; B01D 29/0059; B01D 29/56; B01D 29/58; B01D 35/005; F02M 37/221
See application file for complete search history.

(56) References Cited

U.S. PATENT DOCUMENTS

| 6,572,768 B1 * | 6/2003 | Cline et al. ..................... 210/236 |
| 6,706,181 B1 | 3/2004 | Baumann et al. |
| 2008/0202081 A1 | 8/2008 | Schmid et al. |
| 2012/0261326 A1 * | 10/2012 | Deschamps et al. .......... 210/236 |

FOREIGN PATENT DOCUMENTS

| DE | 3903675 | 8/1990 |
| DE | 10353424 | 6/2005 |
| DE | 102007009352 | 8/2008 |

(Continued)

*Primary Examiner* — Benjamin Kurtz
(74) *Attorney, Agent, or Firm* — Greer, Burns & Crain Ltd.

(57) ABSTRACT

A liquid filter including a filter housing, a ring filter insert and a cover. The housing bottom contains an outlet for emptying the housing when the filter insert is removed. The filter insert includes a filter material body surrounded by front panels. A blocking element for the outlet is arranged on one front panel, and positioning elements are provided on the filter insert and on the housing. The positioning elements include an inclined plane and an engaging radially protruding nose. The inclined plane is arranged on one and the nose is arranged on the other of the filter housing part and the ring filter insert. When the ring filter insert is rotated relative to the filter housing, the inclined plane and the nose are moved in relation to each other such that they slide along each other and engage the blocking element with the outlet.

30 Claims, 20 Drawing Sheets

(56) References Cited

FOREIGN PATENT DOCUMENTS

| DE | 20 2007 001 227 | * 10/2008 |
| DE | 202007001227 | 10/2008 |
| EP | 1229985 | 8/2003 |
| JP | 05115869 | 5/1993 |
| JP | 2004136203 | 5/2004 |

* cited by examiner

LIQUID FILTER

BACKGROUND OF THE INVENTION

The invention relates to a liquid filter, in particular an oil filter for an internal combustion engine, comprising a filter housing, comprising a ring filter insert, which is arranged therein so as to be replaceable, and comprising a removable cover, which closes the filter housing during operation, wherein the filter housing encompasses at least one inlet for raw liquid to be filtered, which empties into a raw side of the filter housing, and a return, which starts at a clean side of the filter housing, for filtered clean liquid, wherein an eccentric outlet is arranged in a bottom of the filter housing for emptying the filter housing when the ring filter insert is removed, wherein the ring filter insert consists of a hollow-cylindrical filter material body, which is surrounded on the front side by front panels and which separates the raw side and the clean side from each another, wherein an eccentric blocking element for the outlet is arranged on the front panel facing the bottom, and wherein interacting positioning means are provided on the ring filter insert and on the filter housing, which bring the blocking element into engagement with the outlet when the ring filter insert is inserted into the filter housing.

A first liquid filter of the afore-mentioned type is known from DE 39 03 675 C2. This document shows an oil filter comprising a filter housing and a ring filter insert, which is arranged therein so as to be capable of being replaced. On its lower front panel, the ring filter insert has an eccentric bolt as closure for an eccentric outlet, which is provided in the bottom of the filter housing and which provides for an emptying of the filter housing in response to a replacement of a filter insert. Provision is made on the ring filter insert and on the filter housing for interacting positioning means, which only allow for an axial insertion of the filter insert in a position, which orients the bolt towards the opening of the outlet. Preferably, the positioning means are axially engaging groove and spring means, which are matched to one another, whereby the spring is provided in the filter housing as a rib, which protrudes radially inward, and the groove is provided in the circumference of the lower front panel of the ring filter insert.

It is to be considered to be a disadvantage of this known filter that, in response to the installation of the ring filter insert into the filter housing, an operator must actively establish the correct rotational position between these two parts, wherein experience shows that errors can be made easily.

A further relevant liquid filter is known from EP 1 229 985 B1. This document also shows a liquid filter comprising a filter housing a ring filter insert. On its lower front panel, the ring filter insert has an eccentric bolt for closing an outlet, which is arranged eccentrically in the bottom of the filter housing and through which the filter housing is emptied when the filter insert is replaced. A ramp, which runs circularly, which points upwards, which is embodied so as to slope in the direction of the outlet, and via which the bolt slides into the outlet by rotating the ring filter insert about itself, is embodied on the bottom of the filter housing.

It is disadvantageous here that the bottom of the filter housing is occupied with the ramp and that thus hinders the arrangement of other elements, such as channels or valves, which are required for the functioning of the liquid filter, or which even makes it impossible.

A third liquid filter of the afore-mentioned type is described in DE 103 53 424 A1. In the case of this liquid filter, the corresponding ring filter insert also has an eccentric bolt on its lower front panel as first press-lock element for closing an outlet as second press-lock element. Provision is furthermore made on the ring filter insert and on the filter housing for interacting guide means for a closable orientation of the two press-lock elements, wherein the guide means and the press-lock elements are embodied separately from each other. Preferably, the one guide means is a circular guide track comprising a circumferential interruption in the form of an axial slot and the other guide means is a stop, which can be inserted into the axial slot. The guide track can thereby be inclined, preferably with an incline, which corresponds to the thread pitch of a screw cap of the filter housing. Preferably, the guide track is provided on the bottom side of the lower front panel of the ring filter element.

The overall size of this known filter insert is markedly extended by means of the guide means, which requires an enlarged filter housing when maintaining the filter surface, or which leads to a reduction of the filter surface of the filter insert when the size of the filter housing stays the same.

SUMMARY OF THE INVENTION

It is thus an object of the instant invention to create a liquid filter of the afore-mentioned type, which avoids the defined disadvantages and in the case of which a reliable automatic engagement-compatible positioning of blocking element and outlet is ensured in response to the installation of the ring filter insert in the filter housing in response to a space-saving construction.

According to the invention, the solution of this object succeeds by means of a liquid filter of the afore-mentioned type, which is characterized in that the first positioning means is an inclined plane, which is embodied or arranged
a) on the outer circumference of a filter housing part arranged inside the ring filter insert or
b) on the inner circumference of the ring filter insert or
c) on the outer circumference of the ring filter insert or
d) on the inner circumference of the filter housing and
that the second positioning means is a radially protruding nose, which, being arranged opposite the inclined plane is embodied or arranged
a) on the inner circumference of the ring filter insert or
b) on the outer circumference of the filter housing part arranged inside the ring filter insert or
c) on the inner circumference of the filter housing or
d) on the outer circumference of the ring filter insert,
wherein the inclined plane and the nose can be moved in relation to each other in such a way that they slide along each other and bring the blocking element into engagement with the outlet when the ring filter insert is rotated in relation to the filter housing.

It is advantageously obtained with the invention that the bottom of the filter housing is kept completely free from the positioning means. A large constructive freedom is obtained through this in response to the arrangement of further elements of the liquid filter in the area of the bottom of the filter housing. Due to the fact that the positioning means are arranged on opposite inner and outer circumferences of the filter housing on the one hand and of the ring filter insert on the other hand, they cannot lead to an increase of the overall size of the liquid filter. In addition, the positioning means can be embodied with a very small overall size, viewed in radial direction, so that an increase of the diameter of the filter housing or a reduction of the diameter of the ring filter insert also does not become necessary to accommodate the positioning means. Depending on the embodiment of the liquid filter and of the corresponding filter insert, the positioning means can be arranged on the inner and outer circumferences, which are in each case best suitable for this purpose. Advantageously, there is also a relatively large constructive freedom in view of the arrangement of the positioning means. The ring filter insert can be inserted into the filter housing in any rotational position relative thereto. By rotating the ring filter insert about itself, which might be necessary, the positioning means guide the blocking element arranged thereon to the outlet in an engagement-compatible manner as soon as the positioning means come into contact with each other. Special attention of the operator, who installs the filter insert, is not required hereby, whereby installation errors are virtually eliminated.

A preferred further development of the invention proposes for the inclined plane to be formed by two partial planes, which run towards each other in opposite direction and which in each case extend across half of the inner or outer circumference of the ring filter insert or half of the inner circumference of the filter housing or half of the outer circumference of the filter housing part arranged inside the ring filter insert. With this embodiment of the inclined plane, the engagement-compatible merging of blocking element and outlet is possible with the minimally possible rotation of the ring filter insert, because the latter must perform maximally half a rotation. This once again facilitates and speeds up the installation of the filter insert into the filter housing.

To make the automatic engagement-compatible merging of blocking element and outlet to be particularly safe and reliable in response to the installation of the filter insert into the filter housing, provision is made for the inclined plane to encompass an incline, which excludes a self-locking. It is attained with this that the filter insert is brought into its engagement-compatible rotational position for the blocking element relative to the outlet virtually solely by means of the force of gravity. In particular, it is necessary that a limited torque is transferred to the ring filter insert via the cover, which can typically be screwed.

In the case of certain embodiments of outlet and blocking element, a purely axial feeding of the blocking element onto or into the outlet is required. In these cases, provision is made for a guide for the nose, which runs in axial direction, to connect to the lower end of the inclined plane. In the case of this embodiment, the engagement-compatible rotational position of the filter insert is thus established initially, which is followed by an axial movement, which establishes the engagement between blocking element and outlet, without additionally superimposing this engagement movement with a rotary motion.

Following the inclined plane, a further development to this effect proposes for the guide for the nose, which runs in axial direction, to initially encompass a first guide section comprising a width, which is at least 50% larger than the width of the nose and for the first guide section to merge into a following second guide section comprising a width, which corresponds to the width of the nose in addition to a mobility, which is sufficient for a displacement of the nose in the second guide section without jamming. In interaction with the nose, the first, wider guide section here ensures a prepositioning of the blocking element relative to the outlet, whereafter the second, narrower guide section then carries out the fine-positioning of the blocking element relative to the outlet. The transfer from the first guide section to the second guide section is thereby preferably embodied in a funnel-shaped manner, so as to ensure a favorable guiding of the nose.

To obtain a construction, which is technically simple and operationally reliable at the same time, the inclined plane or the partial planes thereof are in each case preferably formed by means of a radially protruding rib or step, which forms a contact surface for the nose on the upper or lower side.

A solution, which is favorable in particular in view of production technology, is obtained when the inclined plane is embodied integrally with the filter housing or with the ring filter insert. This embodiment allows for a cost-efficient mass production of the liquid filter and of the corresponding ring filter insert, which is advantageous when large quantities must be produced, as is the case for oil filters for internal combustion engines, for example.

In the alternative, it is also possible for the inclined plane to be made as a separate part and to be connected to the filter housing or to the ring filter insert. In particular, this embodiment allows for a selective equipment of the filter housing or of the ring filter insert with an inclined plane, whereby already available, common filter housings and filter inserts can still be used in an advantageous manner.

Due to the fact that the nose must only have a small size as one of the positioning means, the nose is advantageously embodied integrally with the filter housing or with the ring filter insert. In addition to a favorable production, a low sensitivity of the nose against damages is also obtained in this manner.

Depending on the embodiment of the outlet in the filter housing, the blocking element can be embodied differently in line therewith. For example, the blocking element can be a radially or axially sealing valve element, which is rigidly connected to the lower front panel, or a radially sealing plug, which is rigidly arranged on the lower front panel. These embodiments are particularly simple in view of production technology and are mechanically robust.

In an alternative second embodiment, the blocking element is an axially sealing valve element, which is elastically arranged on the lower front panel. In this embodiment, the possibility of an automatic compensation of production tolerances and temperature-related length changes of the filter insert and of the filter housing are created.

The outlet arranged in the bottom of the filter housing can be designed differently. Preferably, the outlet is embodied with a seat, which is incorporated on the side of the filter housing or which is inserted as a separate part and which matches the blocking element. On principle, a machining is required for a seat, which is incorporated on the side of the filter housing. When this is to be avoided, a seat in the form of a separate part is used advantageously, wherein this seat can be pressed or engaged or adhered or screwed, for example, into the outlet.

Depending on the embodiment of the liquid filter, a tolerance compensation can take place by means of a force, which prestresses the ring filter insert in downward direction, that is, towards the bottom of the filter housing, or in upward direction, that is, towards the cover. For such liquid filters, the invention proposes for the filter housing part arranged inside the ring filter insert to be a pipe nozzle, which includes the return and which is rigidly connected to or is integrally formed with the remaining filter housing or which is guided so as to be movable in the remaining filter housing in axial direction and is prestressed with a spring force, which points in the direction of the cover. In the case of the pipe nozzle, which is rigidly connected to or which is integrally formed with the remaining filter housing, the filter insert can simply be prestressed downwards at its upper side. When the ring filter insert, in its installed state, is located on the pipe nozzle, which is embodied so as to be movable, the prestressing force acts on the filter insert by means of the pipe nozzle and together with the latter in the direction of the cover. In both of the embodiments mentioned herein, a spring, which, as a positioning means arranged at that location, could lead to constructive limitations, must thus not be arranged in the filter housing in the area between the bottom thereof and the bottom side of the ring filter insert.

The assembly times are important cost factors for the production costs of a liquid filter. To keep the production effort and the assembly time low in response to the production of the liquid filter according to the invention, provision is made for the pipe nozzle to be connected to or to be embodied integrally with a seat, which matches the blocking element and which is inserted into the outlet so as to be axially parallel to the pipe nozzle. In this embodiment, the pipe nozzle and the seat can be installed into the filter housing in a common assembly step.

In particular in the case of internal combustion engines of motor vehicles, there is a tendency to combine components, which belong to the internal combustion engine, to form modules. For instance, it is thus generally known to combine an oil filter with a heat exchanger as oil cooler in a module, wherein the heat exchanger is for the most part connected in series with the liquid filter. Due to the fact that a change of an oil filter insert is typically combined with an oil change, as little contaminated residual oil as possible is to remain in the oil filter and in the oil cooler. For this specific arrangement, the invention proposes a liquid filter, which is characterized in that the outlet, viewed in outlet direction, encompasses three outlet sections, in each case comprising a smaller diameter, wherein an outlet branch channel of a component, which is assigned to the liquid filter and which guides the same liquid, empties into the outlet section comprising the smallest diameter, that a pipe section is arranged in the outlet so as to be axially displaceable and so as to be prestressed with a spring force, which points to the cover, wherein the pipe section supports a seat, which matches the blocking element, on its upper end and a first, upper radial seal on its lower end, that the pipe section encompasses an appendage, which extends axially downwards from its lower end and which supports a second, lower radial seal on its lower end, wherein the radial seals, being axially spaced apart from one another, interact with the outlet sections comprising the two smaller diameters so as to form a seal and wherein the lower radial seal is first transferred out of the outlet section comprising the smallest diameter into the outlet section comprising the average diameter, while the upper radial seal remains in the outlet section comprising the average diameter, in response to the upwards movement of the pipe section from a lowermost base position when the cover is removed. It is effected herewith that the pipe section is lifted by means of the spring force when the ring filter insert is removed from the housing, whereby a discharge of liquid from the corresponding component, such as heat exchanger, is initially released into the outlet. Only when the blocking element has also been lifted from the seat, which is arranged on the upper end of the pipe nozzle, the liquid located in the filter housing also runs into the outlet.

In the case of all of the embodiments of the afore-described liquid filter, the ring filter insert can be inserted into the housing or can be removed from the filter housing separately. In the alternative and preferably, due to the better cleanliness of operation, the ring filter insert can also be connected to the cover of the filter housing for transferring axial forces, while being rotatable, as is known per se, for example by means of a snap-lock connection. The filter insert can thus be released from the filter housing together with the cover and can be removed from the filter housing and, vice versa, can also be installed.

In the context of the invention, it is also possible for a plurality of fluid lines or channels to be arranged eccentrically in the bottom of the filter housing and for these fluid lines or channels to be closed via a plurality of eccentric blocking elements, which are arranged accordingly, on the filter insert. At least one of these fluid lines can also be embodied as an inlet into the filter housing, wherein the blocking element can then be embodied as a non-return check valve element, e.g.

Likewise, it is possible in the context of the invention for eccentric lines to be arranged on the bottom of the filter housing for transferring energy and/or transferring signals and for them to be brought into contact with correspondingly arranged, eccentric lines on the filter insert.

BRIEF DESCRIPTION OF THE DRAWINGS

Exemplary embodiments of the invention will be defined below by means of a drawing.

The same parts are provided with the same reference numerals in the different figures of the drawing; not all of the reference numerals will therefore be defined for each drawing figure.

DESCRIPTION OF THE PREFERRED EMBODIMENTS

Figure 1:
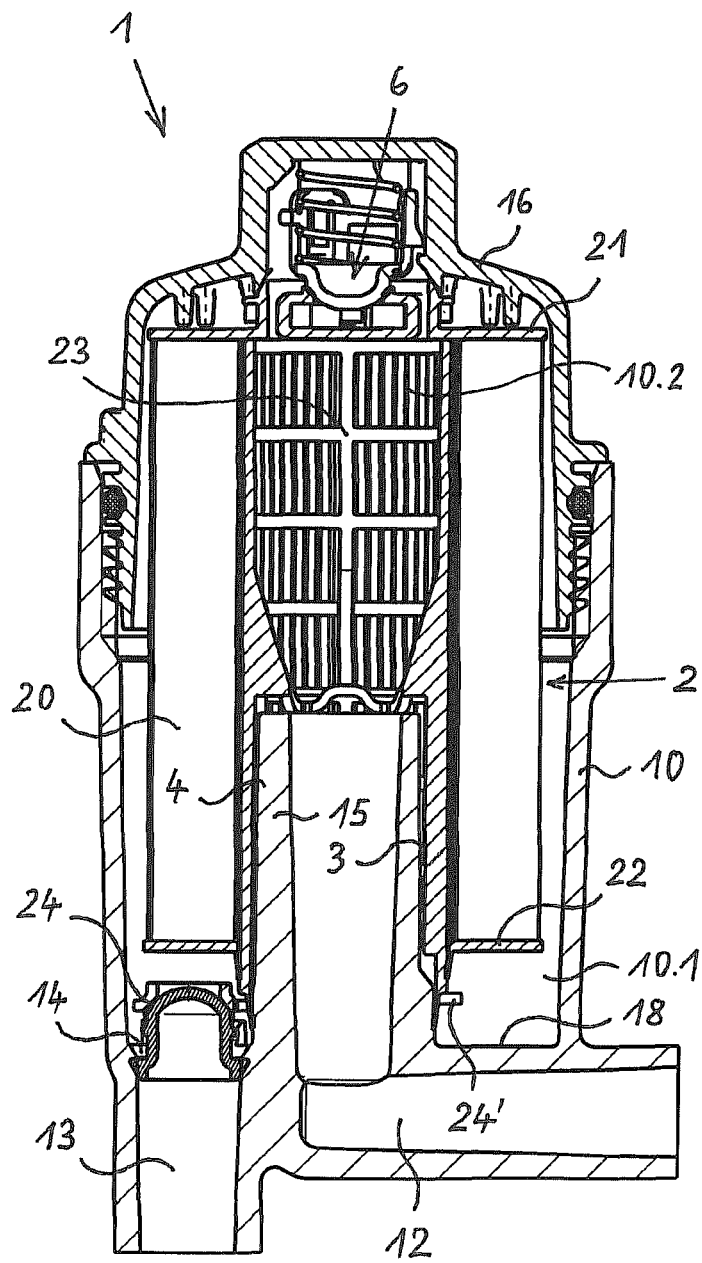
FIGS. 1 to 6 show a first example of a liquid filter in different illustrations.
Figure 2:
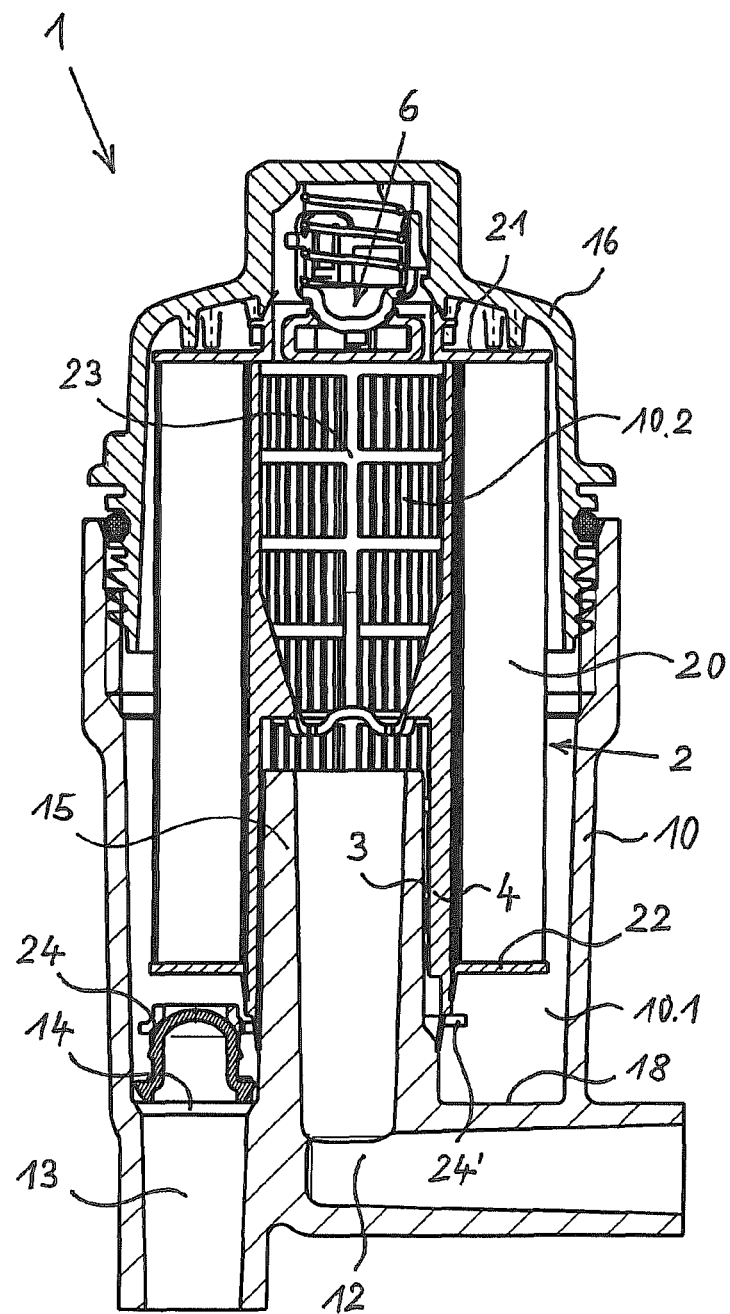

FIGS. 1 to 6 show a first example of a liquid filter according to the invention. In FIGS. 1 and 2, the liquid filter is shown in two different states in longitudinal section. The filter 1 comprises a filter housing 10, which is closed on the top side by means of a screw cover 16. A ring filter insert 2 is arranged inside the filter housing 10 so as to be capable of being replaced. The ring filter insert 2 consists of a filter material body 20, which is surrounded in each case on the top and on the bottom by a front panel 21, 22.

Through an inlet, which is not visible in FIGS. 1 and 2, a liquid, for example lubricating oil of an internal combustion engine, flows to the raw side 10.1 of the filter housing 10. By flowing through the filter material body 20, the liquid flows to the clean side 10.2 of the filter housing 10. The filtered liquid flows off through a return 12. Dirt particles are retained in the filter material body 20.

The filter housing 10 furthermore has an outlet 13, through which an emptying of the filter housing 10 is carried out in response to a replacement of the filter insert 2. During operation of the filter 1, the screw cover 16 is tightly screwed to the filter housing 10. Through this, a blocking element 24 is pressed tightly against a seat 14 in the outlet 13. The blocking element 24 is connected to the lower front panel 22 of the filter insert 2 via spring arms 24' or is embodied integrally. In the state according to FIG. 1, the outlet 13 is thus closed.

To secure the filter material body 20 against collapsing, a grid-shaped support dome 23 is arranged inside the filter insert 2. A filter circumventing valve 6 is arranged in the central upper part of the cover 16.

To ensure that the blocking element 24 is positioned in an accurate engagement-compatible manner to the seat 14 in response to the installation of the filter insert 2 into the filter housing 10, provision is made for positioning means. In the case of the example according to FIGS. 1 and 2, these consist of an inclined plane 3 on the one hand, which is arranged on the inner circumference of the ring filter insert 2, more accurately of the support dome 23 thereof. The second positioning means is a nose 4, which is integrally molded on a central pipe nozzle 15, which rises from a bottom 18 of the housing 10 and which is integrally formed therewith on the outer circumference thereof, here in the form of an elongated vertical rib. Independent on the rotational position, which the filter insert 2 has at the onset of being inserted into the filter housing 10, the inclined plane 3 and the nose 4 as positioning means bring the ring filter insert 2 accurately into the engagement-compatible rotational position, in which the blocking element 24 is brought into engagement with the seat 14.

The liquid filter 1 from FIG. 1 is illustrated in FIG. 2 with partially loosened cover 16. The filter insert 2 is locked on its upper front panel 21 to the screw cover 16 in a manner, which is known per se, via snap-lock means, so that the loosening of the cover 16 leads to a lifting of the filter insert 2. Through this, the blocking element 24 as part of the lower front panel 22 of the filter insert 2 is also lifted and is thus lifted from the seat 14 on the outlet 13. In this manner, the outlet 13 is opened and the liquid located in the filter housing 10 can flow off through the outlet 13, in the case of an oil filter, for example into the oil sump of a corresponding internal combustion engine. A mostly liquid-free filter insert 2 can then be removed from the housing 10.

Figure 3:
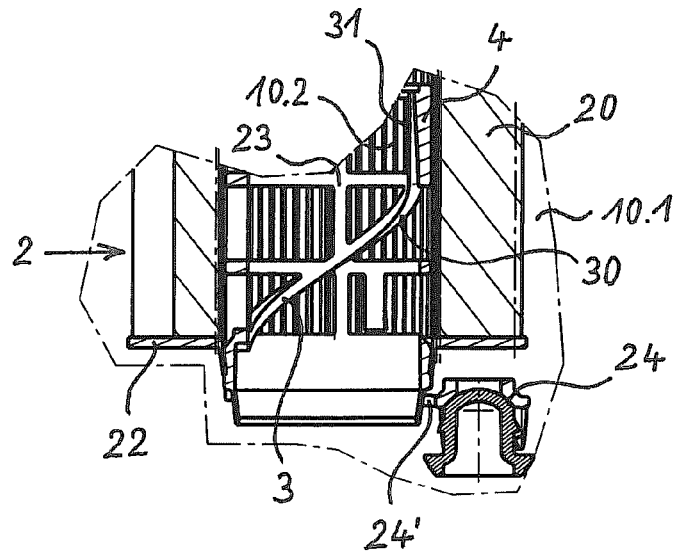

FIG. 3 shows the filter insert 2 of the liquid filter 1 from FIGS. 1 and 2 in a longitudinal section through its lower part. The filter material body 20, which is closed towards the bottom by means of the lower front panel 22, can be seen radially outwardly. The support dome 23, at which the inclined plane 3, which interacts with the nose 4 on the side of the pipe nozzle 15 according to FIGS. 1 and 2, is also arranged, is arranged inside the filter insert 2. The inclined plane 3 with its bottom-side contact surface 30 is embodied integrally here with the support dome 23. An axial guide 31, by means of which a purely axial movement of the filter insert 2 is effected at the end of the positioning of the filter insert 2 in circumferential direction, by means of which the blocking element 24 is brought into axial engagement with the corresponding seat 14, connects to the end of the inclined plane 3, here on the top right in FIG. 3.

Figure 4:
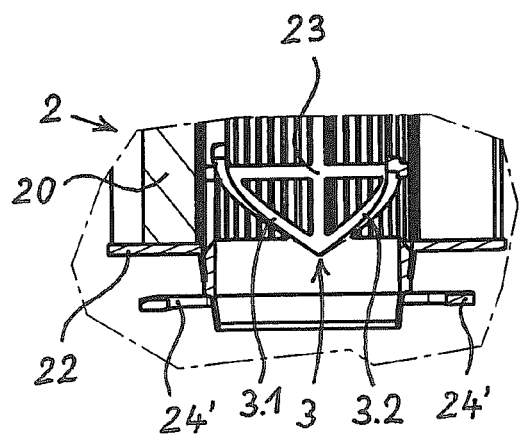

FIG. 4 shows the filter insert 2 from FIG. 3, now in a partial longitudinal section, which is rotated by 90°. The support dome 23 with the inclined plane 3, which is embodied integrally with it, is again located inside the filter insert 2. As can further be seen well in FIG. 4, the inclined plane 3 consists of two partial planes 3.1 and 3.2, which run towards each other. The spring arms 24', which support the blocking element 24, which is located in front of the sectional plane and which is not visible in FIG. 4, are connected to the lower front panel 22.

Figure 5:
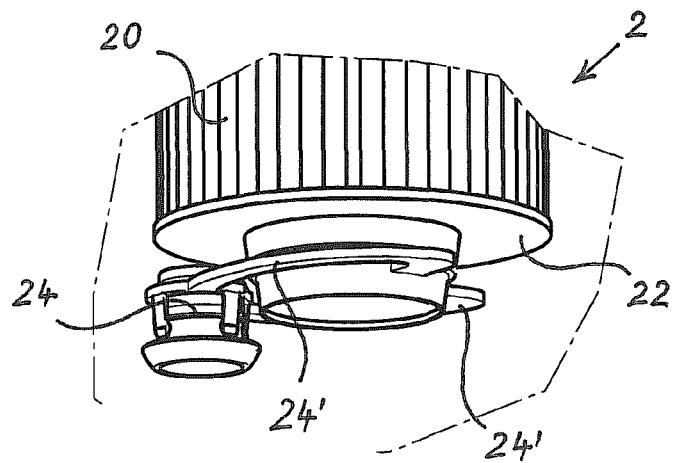

FIG. 5 shows the ring filter insert 1 according to FIGS. 3 and 4 in a perspective bottom view. The filter material body 20, which is covered on the bottom side by the lower front panel 22, is partially visible on the top in FIG. 5. In its center, the front panel 22 has a through hole for attaching to the pipe nozzle 15 according to FIGS. 1 and 2. The two spring arms 24', which support the blocking element 24, are embodied integrally with the front panel 22. Through this, the blocking element 24 is elastic in axial direction, wherein longitudinal tolerances are compensated. In addition, the blocking element 24 is embodied here in two parts, wherein the two parts are locked in place with each other, so as to also ensure a compensation of radial measuring tolerances and angle errors when the blocking element 24 is brought into engagement with the seat 14.

Figure 6:
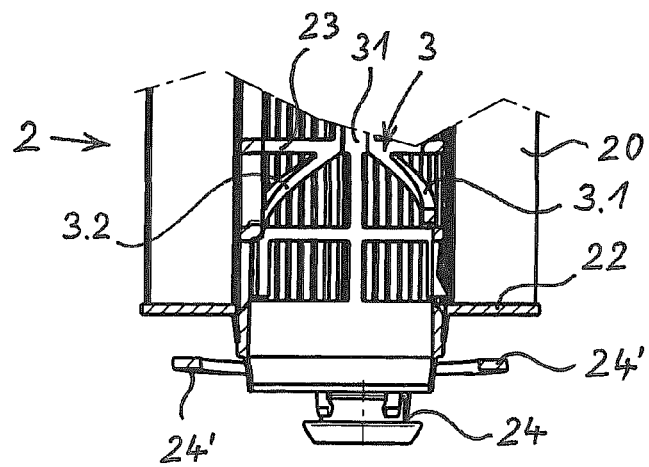

FIG. 6 shows a further partial longitudinal section through the filter insert 2, now with a sectional plane, which is rotated by 180° relative to FIG. 4. The inclined plane 3 with its two partial planes 3.1 and 3.2 is again visible in the center of the filter insert 2. At their end, which is located on the top in FIG. 6, the partial planes 3.1 and 3.2 merge into an axial guide 31.

The lower front panel 22 of the filter insert 2 is visible on the bottom of FIG. 6. The spring arms 24', which support the blocking element 24, run therebelow.

FIGS. 7 to 11 show a second exemplary embodiment of the invention, for which it is characteristic that the inclined plane 3 is provided on a pipe nozzle 15, which is arranged centrally in the filter housing 10 of the liquid filter 1 so as to be axially displaceable and which is prestressed in upwards direction by means of a spring 15'. In the alternative, the pipe nozzle 15 can also be connected to the remaining filter housing in an axially stationary manner.

Figure 7:
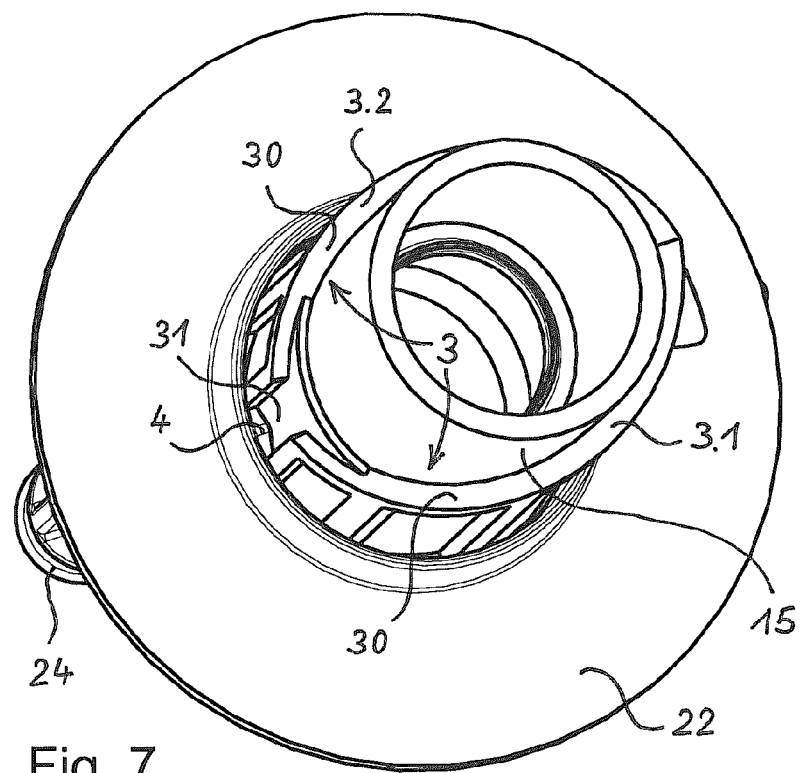
FIGS. 7 to 11 show a second exemplary embodiment of the liquid filter in different illustrations.

Initially, FIG. 7 shows only the pipe nozzle 15 and the lower front panel 22 of the filter insert 2 as individual parts, so as to illustrate the interaction thereof. In the case of the example according to FIG. 7, the inclined plane 3 also consists of two partial planes 3.1 and 3.2, which run towards each other and which merge into an axial guide 31 at their lower end. The upper side of the partial planes 3.1 and 3.2 in each case form a contact surface 30 for a nose 4, which is integrally molded on the inner circumference of the front panel 22. When the filter insert 2 encompasses a rotational position, which does not match for the engagement of the blocking element 24 with the corresponding seat 14 in response to the installation of the filter insert 2, the nose 4 initially impacts the inclined plane 3, here one of its partial planes 3.1 or 3.2. In response to a further downwards movement, the front panel 22 is inevitably brought into the correct rotation, in which it is shown in FIG. 7, by means of the nose 4, which slides on the inclined plane 3. In this correct position relative to the outlet, which is engagement-compatible for the blocking element 24, the nose 4 is located in the axial guide 31, which follows the inclined plane 3. Viewed in circumferential direction of the front plane 22, the nose 4 thereby has a width, which corresponds to the width of the axial guide 31 in addition to a mobility, which is necessary for a displacement of the nose 4 in the guide 31 without jamming.

Figure 8:
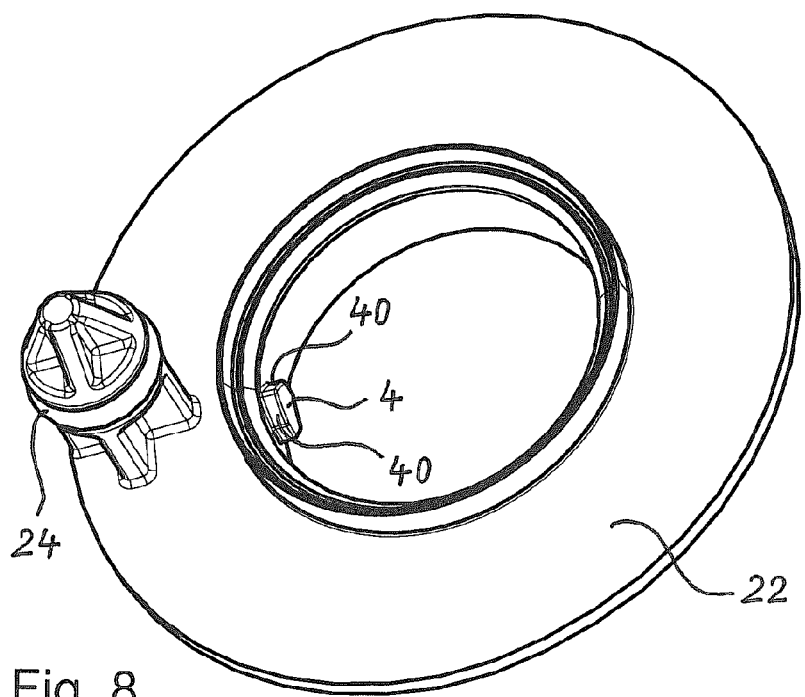

FIG. 8 shows the front panel 22 from FIG. 7 in a bottom view as individual part. The through hole, on the inner circumference of which the nose 4 is integrally molded with two sliding surfaces 40, which are arranged diagonally, is located in the center of the front panel 22. The rigid blocking element 24, which is integral with the front panel 22, is visible here on the left in FIG. 8.

Figure 9:
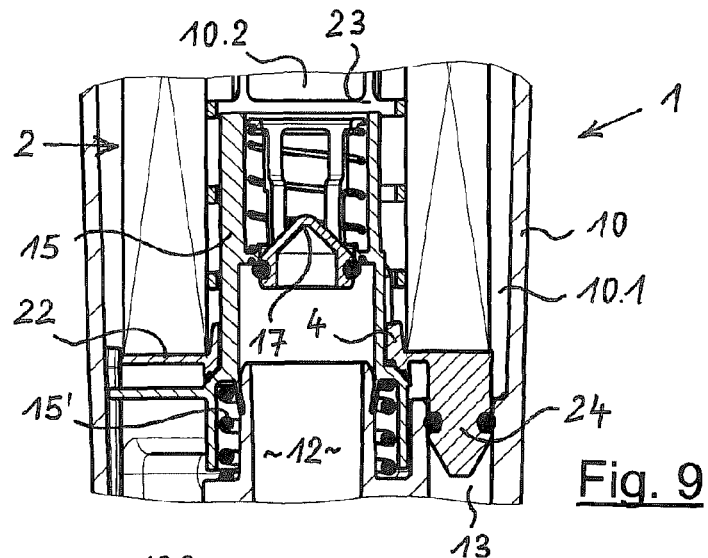
Figure 10:
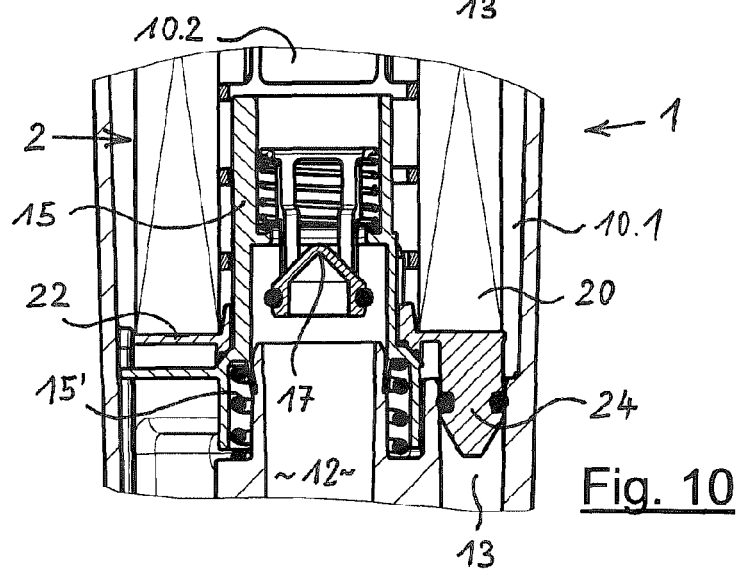
Figure 11:
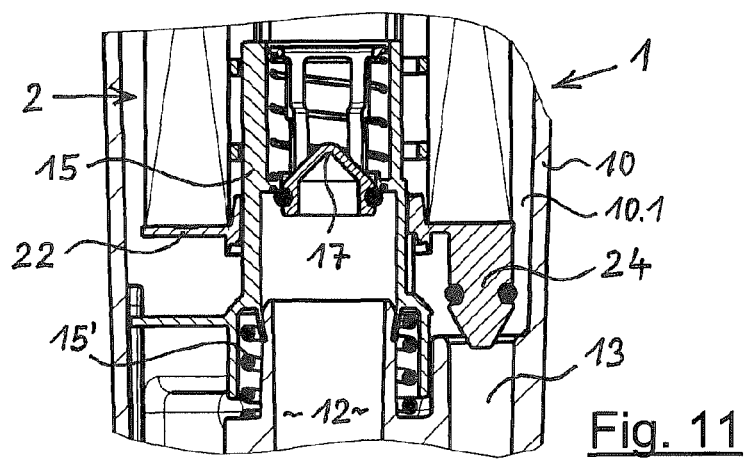

FIGS. 9 to 11 show, in each case in a partial longitudinal section, three different states of the liquid filter 1, which is equipped with a pipe nozzle 15 and a lower front panel 22 of its filter insert 2 according to FIGS. 7 and 8.

In FIG. 9, the filter insert 2 in the filter housing 10 is in its lowest position, which it assumes during normal operation of the liquid filter 1. The blocking element 24 is located here in the outlet 13 and closes it, as long as the liquid, which is to be filtered, is not pressurized.

When the liquid in the liquid filter 1 is guided to the raw side 10.1 under pressure, the liquid flows through the filter material body 20 to the clean side 10.2. The liquid pressure on the clean side 10.2 opens the non-pressure check valve 17 and the filtered liquid can flow off through the return 12.

FIG. 11 shows the state of the liquid filter 1 at the onset of a removal of the filter insert 2, which has already been moved slightly upwards here. Through this, the blocking element 24 has been moved out of the outlet 13, whereby the liquid located in the filter housing 10 can flow off through the outlet 13. Due to the fact that the liquid in the housing 10 is now not pressurized, the non-pressure check valve 17 is now closed again. Liquid from the raw side 10.1, which has not yet been filtered, can thus not reach the return 12 for cleaned liquid.

FIGS. 12 to 16 show an exemplary embodiment, in the case of which the inclined plane 3 is provided on the outer circumference of the filter insert 2 and wherein a nose 4, which interacts with the inclined plane 3, is arranged on the inner circumference of the filter housing 10.

Figure 12:
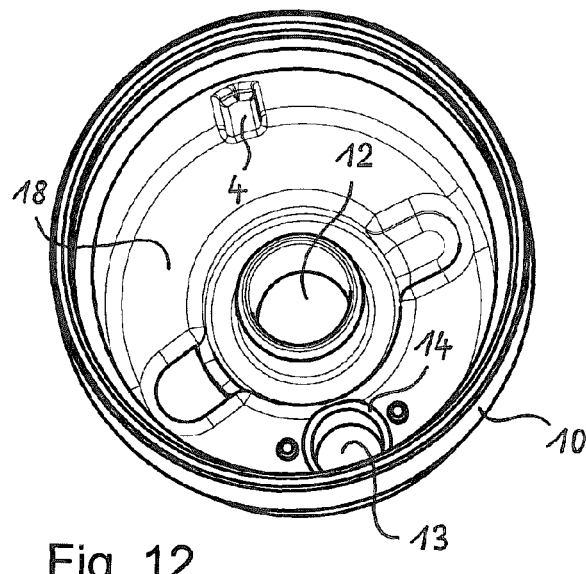
FIGS. 12 to 16 show a third exemplary embodiment of the liquid filter in different illustrations.

FIG. 12 initially shows a view into the inside of the filter housing 10. The return 12 is visible in the center of the bottom 18 of the filter housing 10. The outlet 13 with the seat 14 is located radially outside thereof, below it in FIG. 12, for interacting with a blocking valve 24 on the corresponding ring filter insert 2. The nose 4, which is integrally molded here, can be seen on the inner circumference of the filter housing 10 on the top in FIG. 12.

Figures 13, 14:
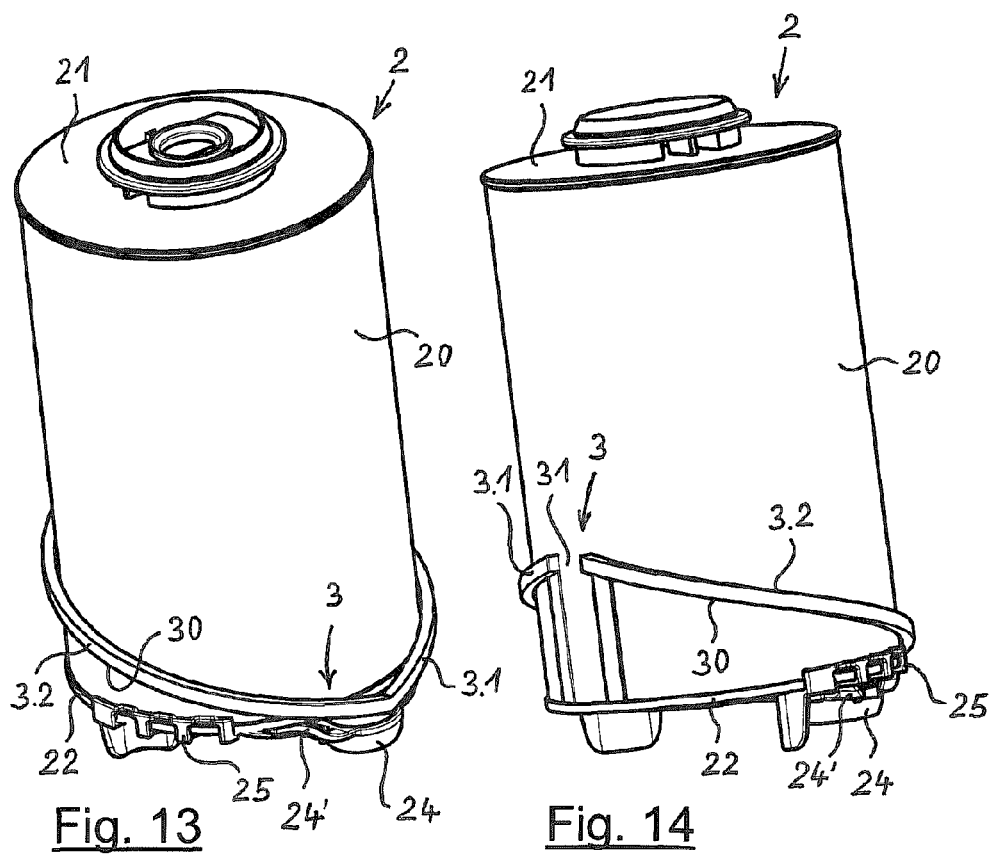

FIGS. 13 and 14 show the corresponding ring filter insert 2 in two different perspective views. In each case, the upper front panel 21 is visible on the top and the lower front panel 22 is visible on the bottom, enclosing the filter material body 20 between one another. The inclined plane 3, which again consists of two partial planes 3.1 and 3.2 here, is arranged around the outer circumference of the lower area of the filter insert 2. The bottom side of the partial planes 3.1 and 3.2 in each case forms a contact surface 30, which merges into the vertical guide 31 according to FIG. 14 at the end of the inclined plane 3. The inclined plane 3 is embodied here either integrally with the lower front panel 22 or is subsequently connected to the lower front panel 22 as individual parts.

In the case of this exemplary embodiment, the blocking element 24 is not embodied integrally with the lower front panel 22, but is subsequently connected to the front panel 22 by means of a latching support 25.

The interaction of inclined plane 3 and nose 4 here also ensures that the filter insert 2 automatically reaches its rotational position relative to the seat 14 in the outlet 13, which is engagement-compatible for the blocking element 24, when the filter insert 2 is inserted into the filter housing 10. The incline of the inclined plane 3 is thereby advantageously chosen such that a self-locking is excluded in response to the movement and rotation of the filter insert 2 during its installation into the filter housing 10; the filter insert 10 thus falls into its correct position virtually on its own.

Figure 15:
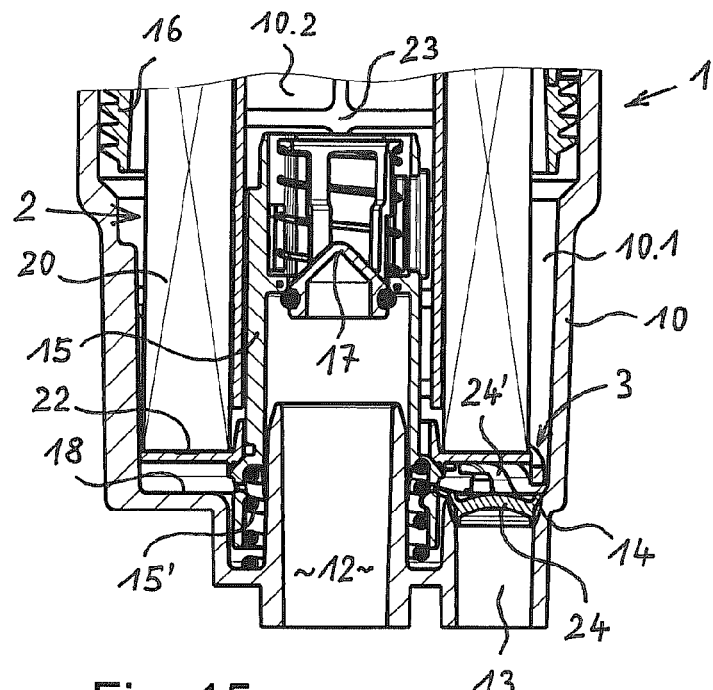
Figure 16:
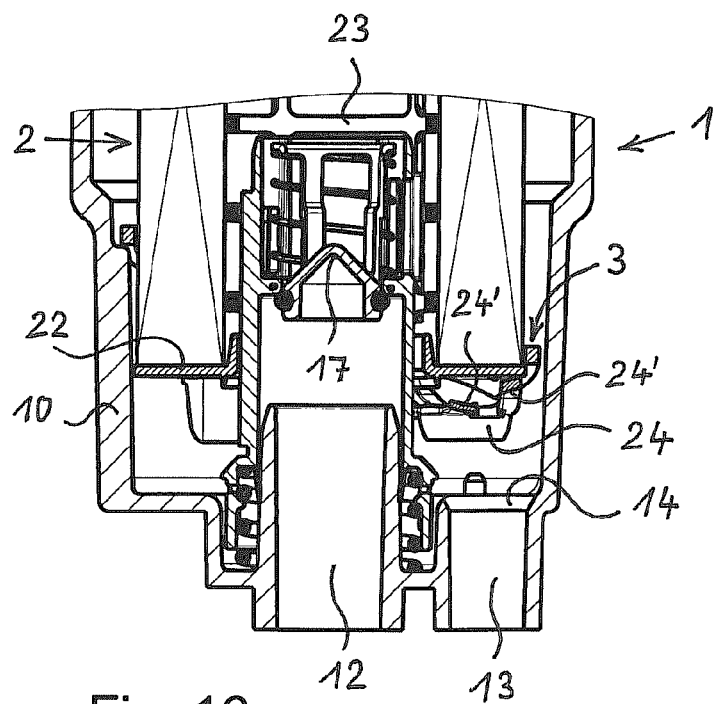

FIGS. 15 and 16 show two different operating states of the liquid filter 1 comprising the filter housing 10 and the filter insert 2 according to FIGS. 12 to 14, in each case in a partial longitudinal section.

In FIG. 15, the cover 16 is fixedly screwed to the filter housing 10 and the filter insert 2 is in its lowest position in the filter housing 10. In this position, the blocking element 24 rests against the seat 14 at the beginning of the outlet 13 and closes it. The non-pressure check valve 17, which is also provided here in the central pipe nozzle 15, remains closed here as long as the liquid in the liquid filter 1 is not pressurized. When the liquid is supplied to the raw side 10.1 under pressure, it flows through the filter material body 20 to the clean side 10.2 and opens the non-pressure check valve 17, so that the filtered liquid can flow off through the return 12. By means of a spring 15', a force, which points upwards, is applied to the axially movable central pipe nozzle 15, so as to push the upper front panel, which is not visible here, against the cover 16, and to seal it there for separating raw side 10.1 and clean side 10.2.

In FIG. 16, the filter insert 2 is lifted slightly upwards, so as to replace it with a new filter insert 2. Through this, the blocking element 24 is released from the seat 14 on the outlet 13 and the outlet 13 is opened, while the non-pressure check valve 17 is closed. Through this, all of the liquid located in the filter housing 10, can discharge through the outlet 13. A small part of the inclined surface 3 is visible on the ring filter insert 2 on the very right in FIGS. 15 and 16. Measuring tolerances are also compensated here via the spring arms 24', which support the blocking element 24.

FIGS. 17 to 20 show an example of the liquid filter 1, in the case of which the inclined plane 3 is embodied integrally on the inner circumference of the filter housing 10 with the latter, and the nose 4, which interacts with the inclined plane 3, is arranged on the outer circumference of the lower front panel 22 of the ring filter insert 2.

Figure 17:
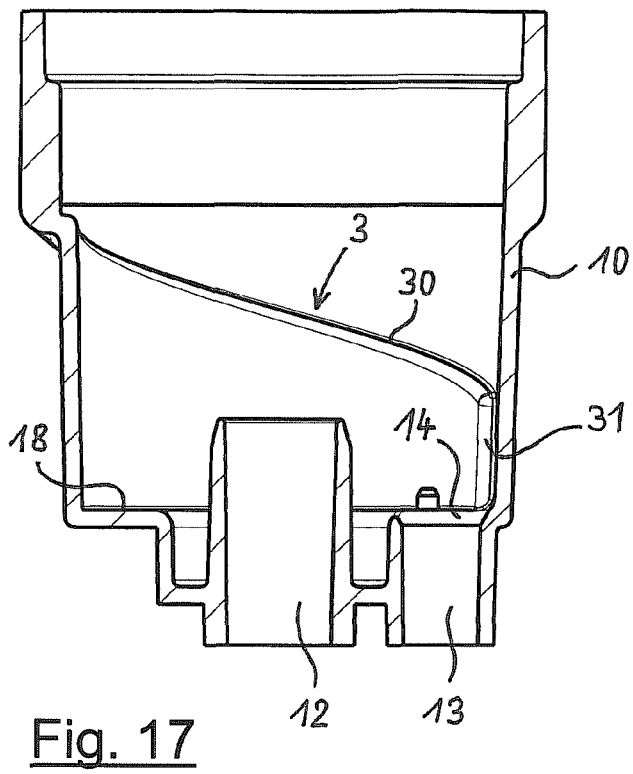
FIGS. 17 to 20 show a fourth exemplary embodiment of the liquid filter in different illustrations.

FIG. 17 shows the filter housing 10 in longitudinal section as an individual part, wherein the inclined plane 3 is visible here as a step on the inner circumference of the filter housing 10. The upper side of the inclined plane 3 here forms the contact surface 30 for the nose 4, which interacts with it. The bottom 18 of the housing 10, in the center of which the return 12 and, eccentrically thereto, the outlet 13 with the seat 14 for the blocking element 24, which interacts therewith, are located, are visible on the bottom of FIG. 17.

Figure 18:
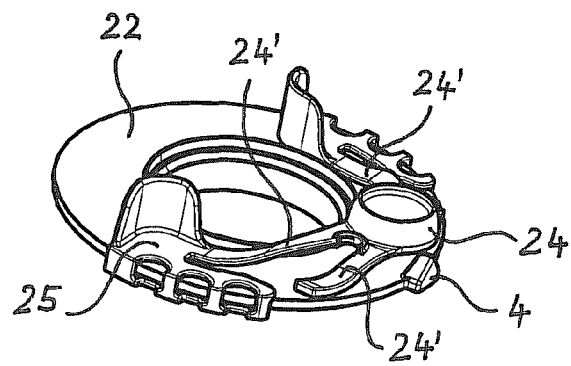

FIG. 18 shows the lower front panel 22 of the ring filter insert 2, which is compatible with the filter housing 10 according to FIG. 17, in a bottom view. Here, the blocking element 24 is again connected to the remaining front panel 22 as separate individual part by means of a latching support 25. An axial mobility of the blocking element 24 relative to the remaining front panel 22 is also ensured here by means of the spring arms 24'. The nose 4, which interacts with the inclined plane 3, which is visible in FIG. 17, is integrally molded to the front panel 22 on the outer circumference thereof.

Figure 19:
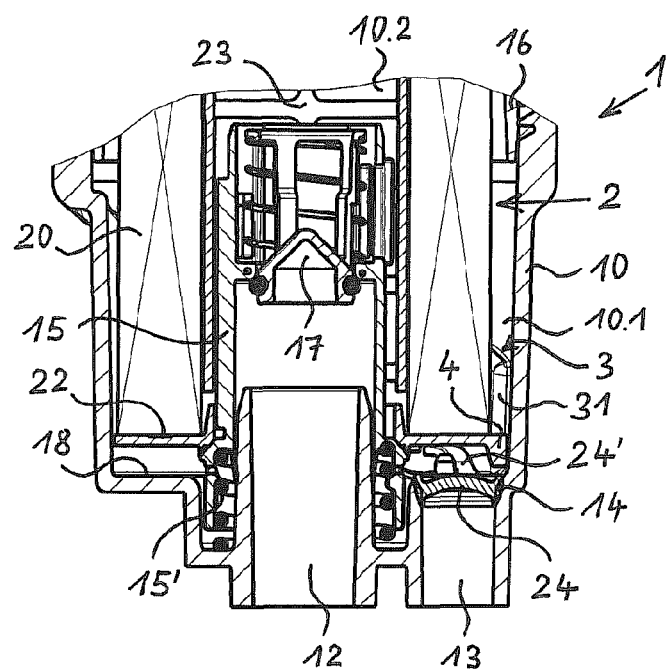
Figure 20:
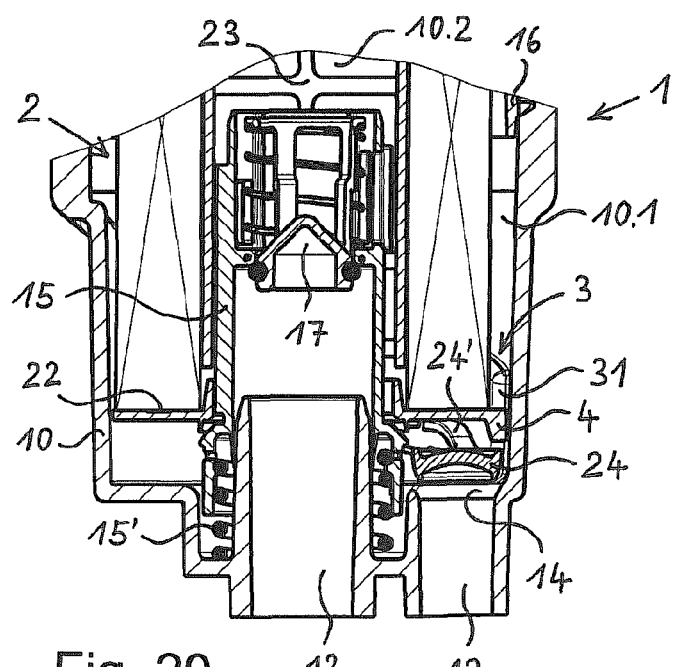

FIGS. 19 and 20 show a liquid filter 1 comprising a filter housing 10 and a lower front panel 23 of the filter insert 2 according to FIGS. 17 and 18 in two different operating states, in each case in a partial longitudinal section.

In FIG. 19, the ring filter insert 2 is illustrated in its lowest position in the housing 10, which it assumes during the normal operation of the liquid filter 1. By means of the inclined plane 3 and the nose 4, the ring filter insert 2 inevitably and accurately reaches the engagement-compatible position for the engagement of the blocking element 24 with the seat 14 on the outlet 13 in response to the its insertion into the filter housing 10.

An axially movable pipe nozzle 15 comprising a spring 15', which prestresses the pipe nozzle upwards, is again arranged in the center of the filter housing 10. Provision is again made in the pipe nozzle 15 for a non-pressure check valve 17, which is illustrated in FIG. 19 as being closed. This closed position exists as long as the liquid in the filter housing 10 is unpressurized. When the liquid is pressurized, it flows from the raw side 10.1 through the filter material body 20 to the clean side 10.2 and from there through the non-pressure check valve 17, which is now open, into the central return 12. In the meantime, the outlet 13 is closed tightly.

In FIG. 20, the ring filter insert 2 is lifted slightly, whereby the blocking element 24 is released from the seat 14 on the outlet 13 and opens the outlet 13. Due to the fact that the liquid is now unpressurized, the non-pressure check valve 17 is in the closed position. All of the liquid thus also flows out of the filter housing here 10 through the outlet 13.

The inclined plane 3 on the inner circumference of the housing 10 as well as the nose 4 on the outer circumference of the lower front panel 22 of the filter insert 2 can be seen on the right in FIGS. 19 and 20, in each case radially outwardly.

Figure 21:
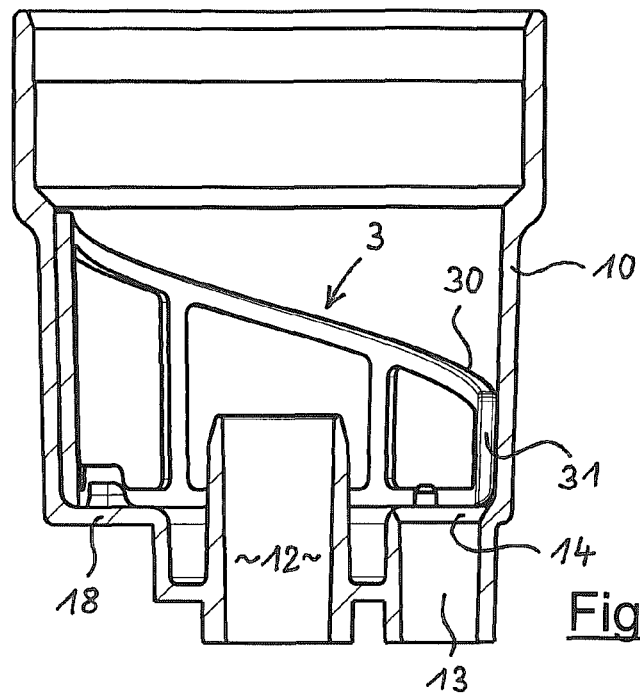
FIGS. 21 to 25 show a fifth exemplary embodiment of the liquid filter in different illustrations.
Figure 22:
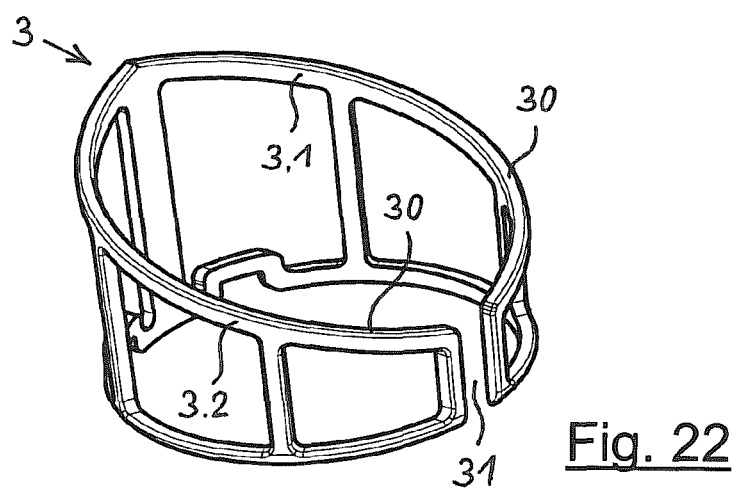
Figure 23:
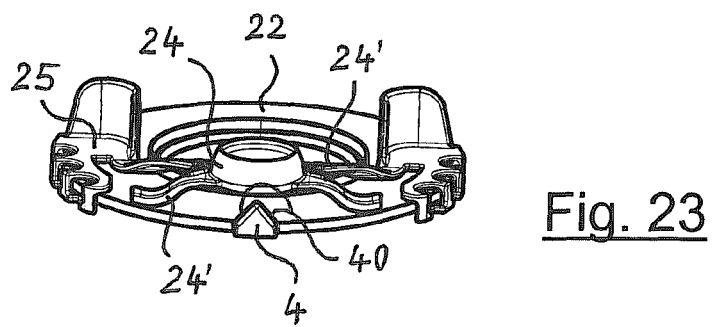

FIGS. 21 to 25 show an embodiment of the filter, in the case of which the inclined plane 3 is arranged in the filter housing 10 as a separate part. For example, the inclined plane 3 is hereby an injection molding part made of plastic. The inclined plane 3 here also consists of the two partial planes 3.1 and 3.2, as is shown in FIG. 23, and the upper side of the partial planes 3.1 and 3.2 in each case form a contact surface 30 for a nose 4 on the outer circumference of a lower front panel 22 of a filter insert 2. A corresponding embodiment of the lower front panel 22 is illustrated in FIG. 23 in a view onto the bottom side thereof. The blocking element 24 is again supported here with spring arms 24' and is connected to the remaining front panel 22 by means of a latching support 25. On the side of the outer circumference of the front panel 22 facing the observer, the nose 4 is integrally molded with two sliding surfaces 40, which run diagonally.

Figure 24:
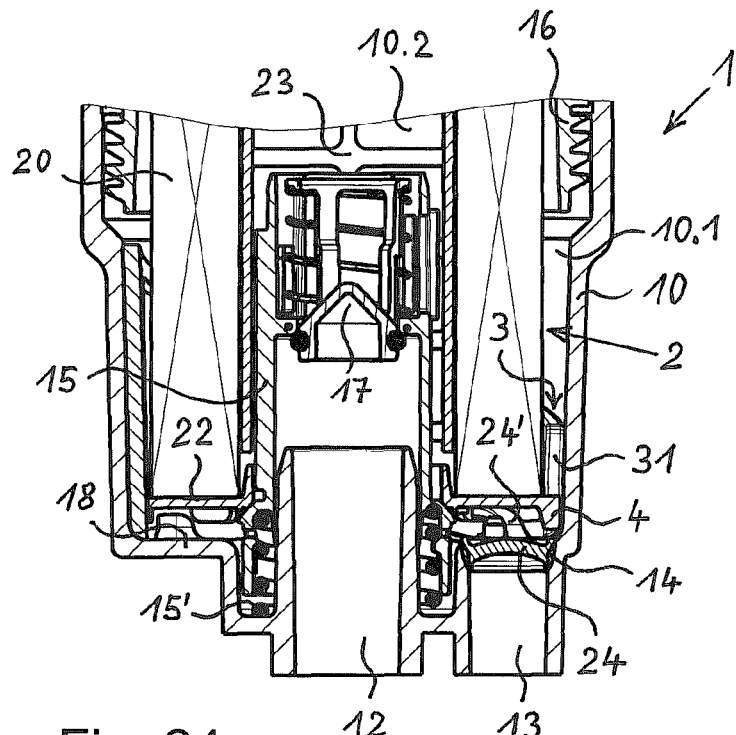
Figure 25:
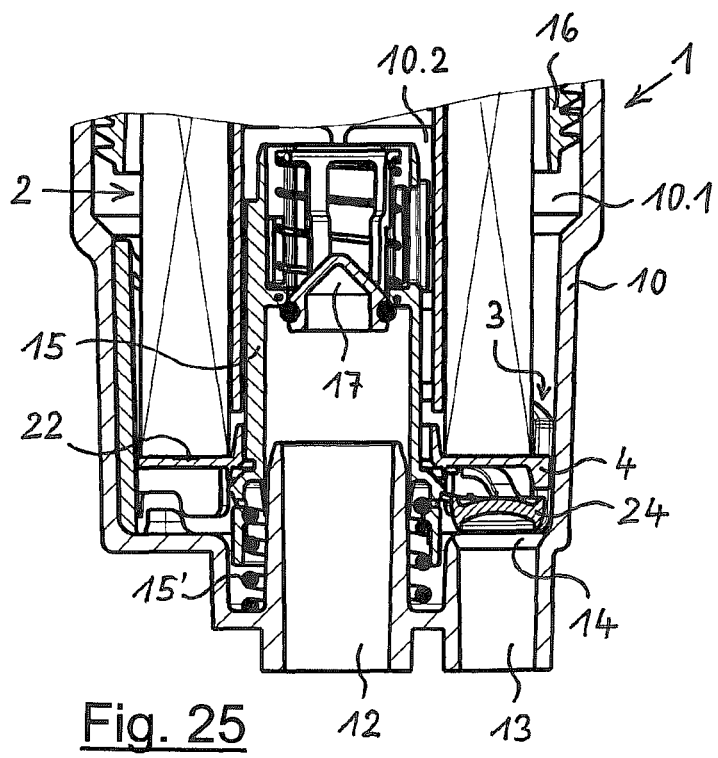

FIGS. 24 and 25 show a liquid filter 1 comprising a filter housing 10, a separate inclined plane 3 and a lower front panel 22 according to FIGS. 21 to 23, in each case in a partial longitudinal section.

In FIG. 24, the liquid filter 1 is again shown in a state, in which the filter insert 2 assumes its lowest position in the filter housing 10 and holds the blocking element 24 in tight engagement with the seat 14 on the outlet 13 through this.

In FIG. 25, the filter insert 2 in the housing 10 is moved slightly upwards, whereby the blocking element 24 has now been released from the seat 14 and the outlet 13 is open.

In each case on the right, the inclined plane 3 can be seen on the lower area of the inner circumference of the housing 10 and the nose 4, which interacts with the inclined plane 3, can be seen on the outer circumference of the lower front panel 22; together, they form the interacting positioning means for the exact, engagement-compatible positioning of blocking element 24 and seat 14 in the outlet 13.

FIGS. 26 to 28 again show an example of the filter, in the case of which the nose 4 is provided as positioning means on the inner circumference of the lower front panel 22 of the spring insert 2 and the inclined plane 3 is provided as further positioning means on the outer circumference of the central pipe nozzle 15.

Figure 26:
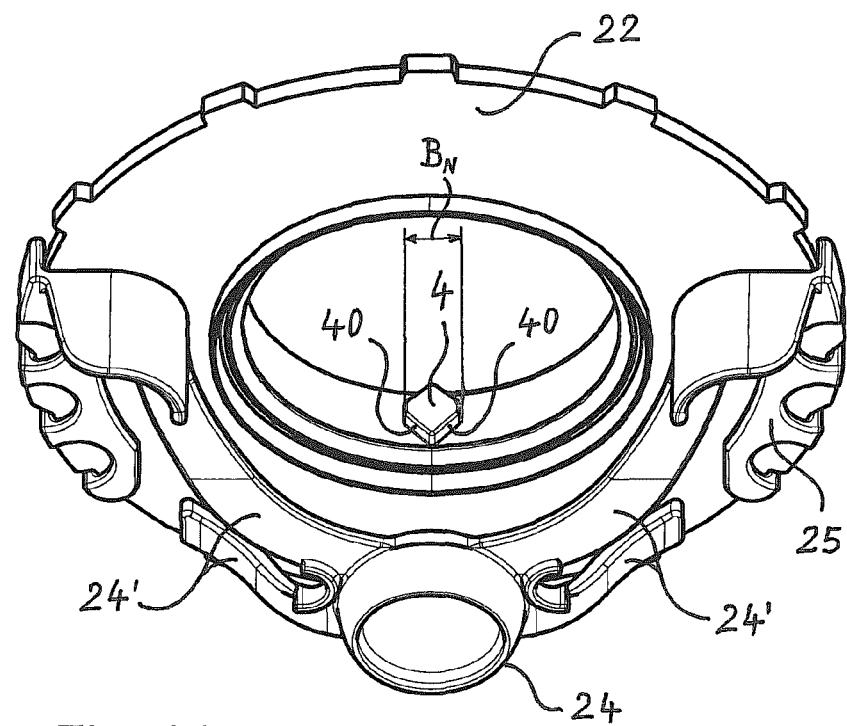
FIGS. 26 to 28 show a sixth exemplary embodiment of the liquid filter in different illustrations.

FIG. 26 shows the lower front panel 22 of the filter insert 2 in a perspective bottom view. In the central through hole of the front panel 22, the nose 4, which is embodied integrally, rests on the inner circumference of the front panel 22 with its two sliding surfaces 40. The nose 4 has a width $B_N$, which corresponds to the width of the corresponding axial guide 31 in addition to a required mobility. The blocking element 24 is held here again by means of spring arms 24' and is connected to the remaining front panel 22 via a latching support 25.

Figure 27:
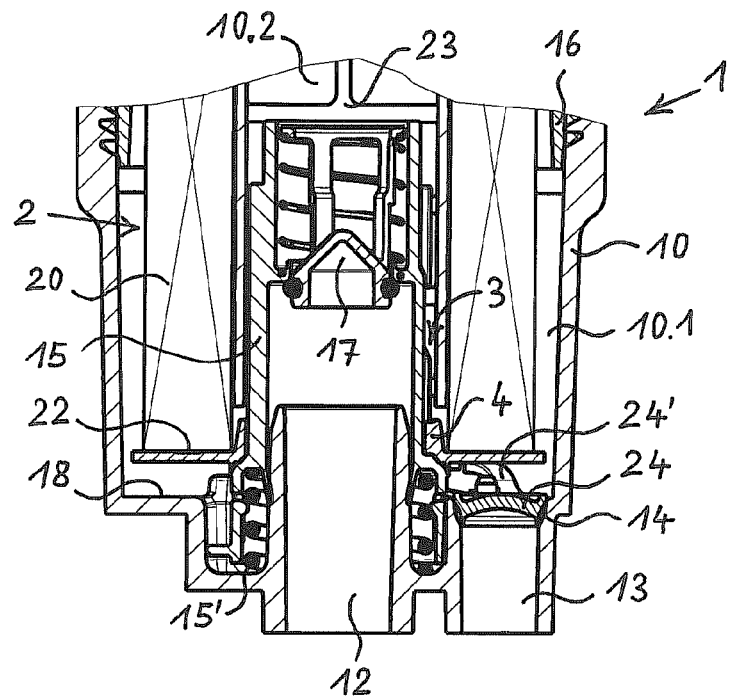
Figure 28:
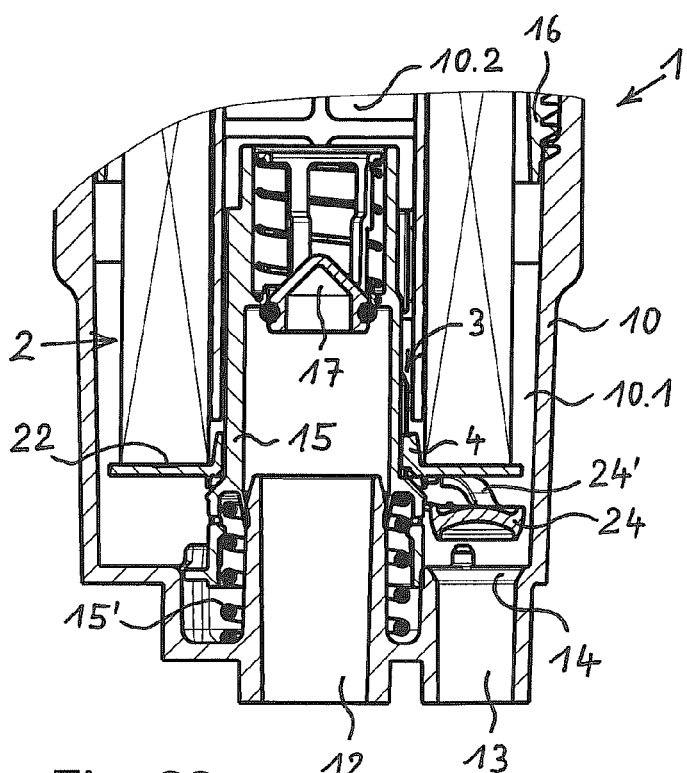

FIGS. 27 and 28 show two operating states of the liquid filter 1, comprising a front panel 22 according to FIG. 26, in each case again in a partial section.

In FIG. 27, the ring filter insert 2 is again inserted completely into the housing 10, wherein the blocking element 24 rests against the seat 14 of the outlet 13 so as to form a seal and closes the outlet 13. An axial tolerance compensation is made possible via the spring arms 24'. The engagement-compatible positioning of the blocking element 24 relative to the seat 14 is carried out via the inclined plane 3 on the outer circumference of the central pipe nozzle 15 and the nose 4 on the inner circumference of the lower front panel 22 of the ring filter insert 2. By supplying pressurized liquid, which is to be filtered, into the raw area 10.1, the liquid flows through the filter material body 20 into the clean area 10.2 and opens the non-pressure check valve 17, which is also provided here, so that the filtered, clean liquid can flow off through the return 12.

In FIG. 28, the ring filter insert 2 is moved slightly upwards, whereby the blocking element 24 is released from the seat 14 on the outlet 13 and opens the outlet 13. The non-pressure check valve 17 is now closed, so that all of the liquid discharges from the filter housing 10 through the outlet 13.

FIGS. 29 to 32 show an example of the invention, in the case of which the inclined plane is provided on the central pipe nozzle 15 and the nose 4 is provided on the inner circumference of the lower front panel 22 of the ring filter insert 2. This example is furthermore characterized in that the central pipe nozzle 15 is produced integrally with or connected to the seat 14 for the outlet 13.

Figure 29:
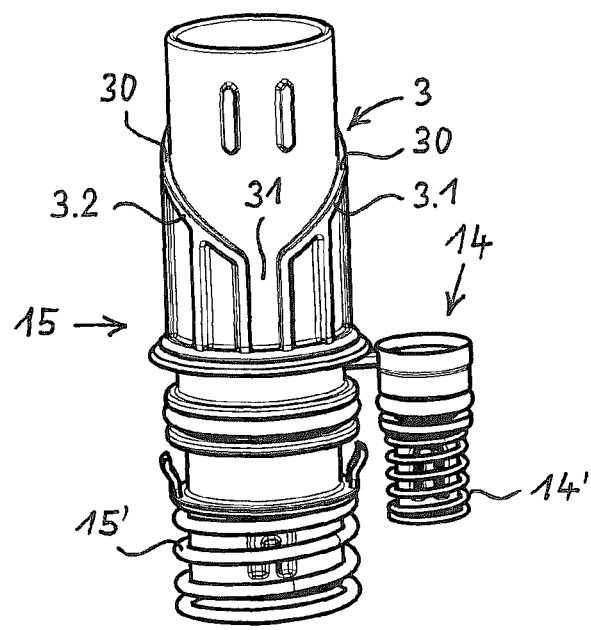
FIGS. 29 to 32 show a seventh exemplary embodiment of the liquid filter in different illustrations.

It can be seen in FIG. 29 that the inclined plane 3 is again formed by means of the two partial planes 3.1 and 3.2, which merge into the axial guide 31 on their end. The upper side of the partial planes 3.1 and 3.2 here form a contact surface 30 for the nose 4. As is further shown in FIG. 29, the central pipe nozzle 15 and the component forming the seat 14 are embodied with parallel longitudinal axes, so that the unit consisting of pipe nozzle 15 and seat 14 can be installed into the filter housing 10 in an axially parallel manner in a single assembly operation. Provision is in each case made on the bottom of the pipe nozzle 15 and on the component, which forms the seat 14, for a spring 15' or 14', respectively, for compensating longitudinal tolerances.

Figure 30:
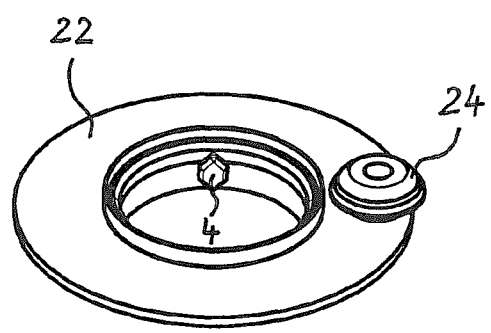

FIG. 30 shows a lower front panel 22 of the filter insert 2 for interaction with the pipe nozzle 15 according to FIG. 29. On the inner circumference of its central through hole, the front panel 22 according to FIG. 30 has the nose 4, which protrudes radially inwardly, as positioning means, which interacts with the inclined plane 3 on the pipe nozzle 15 according to FIG. 29. The inclined plane 3 and the nose 4 here also ensure that a ring filter insert 2 with the front panel 23 and the blocking element 24, which is provided thereon, is automatically brought into an engagement-compatible position to the seat 14 in response to the installation thereof.

FIGS. 31 and 32 again show the liquid filter 1 comprising the elements illustrated in FIGS. 29 and 30, in each case in a partial longitudinal section.

Figure 31:
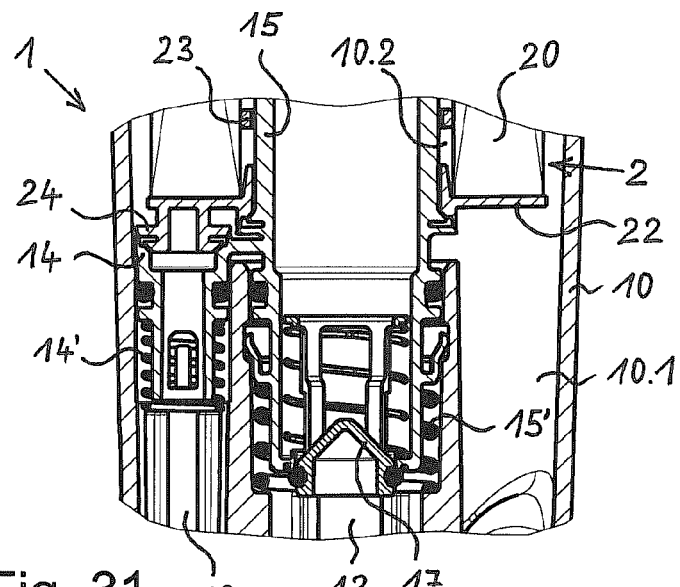

In FIG. 31, the filter insert 2 is arranged in its lowest position in the filter housing 10. In this position, the blocking element 24 closes the outlet 13 by attaching to the seat 14. Provision is again made in the central pipe section 15 for a non-pressure check valve 17, which opens as soon as the pressurized liquid is conveyed through the liquid filter 1.

Figure 33:
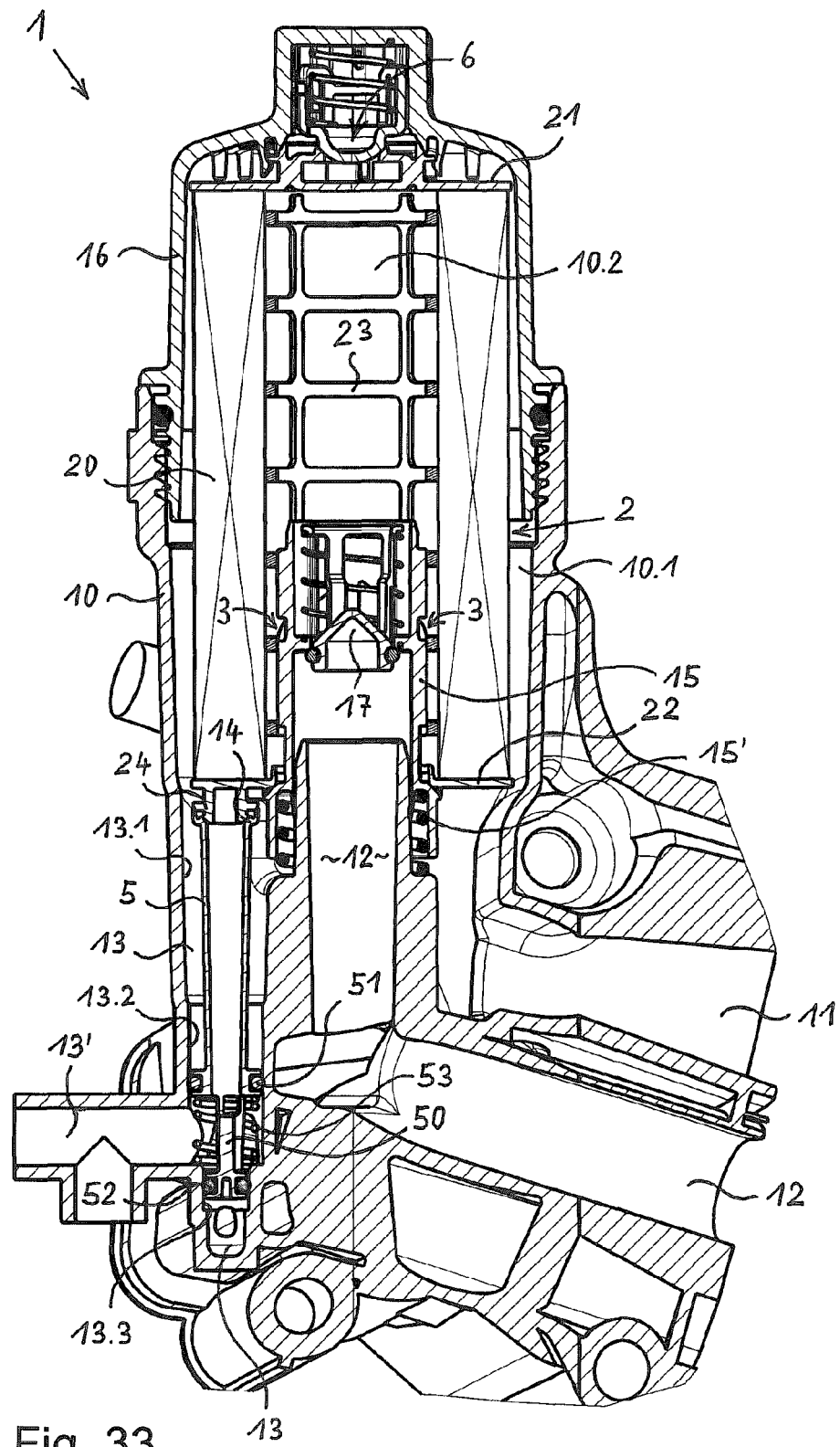
FIGS. 33 to 36 show an eighth exemplary embodiment of the liquid filter in different illustrations.

In FIG. 33, the filter insert 2 is moved slightly upwards within the filter housing 10. Through this, the blocking element 24 is released from the seat 14 and opens the outlet 13, while the return 12 is closed by means of the non-pressure check valve 17 due to the unpressurized state of the liquid in the housing 10. When the filter insert 2 is removed from the filter housing 10, all of the liquid located therein also flows off here through the outlet 13.

Figure 32:
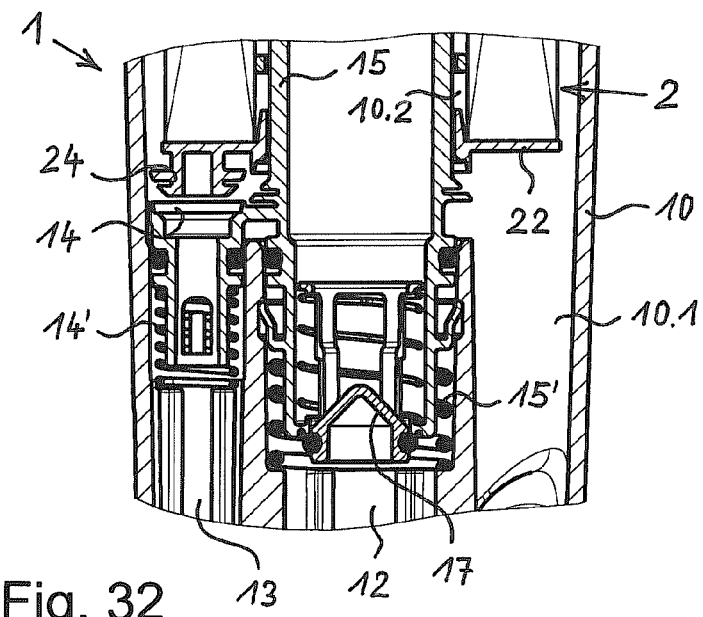

It can also be seen in the sectional illustrations according to FIGS. 31 and 32 that the central pipe section 15 and the seat 14 are connected to form a structural unit and are embodied integrally here. Due to the fact that the return 12 and the outlet 13 run parallel to one another in longitudinal direction of the housing 10, the structural unit consisting of pipe nozzle 15 and seat 14 can be installed into the housing 10 in one assembly step.

FIGS. 33 to 36 show an exemplary embodiment of the invention, wherein further components, which are not illustrated specifically, for example a heat exchanger, is assigned to the liquid filter 1 so as to cool the liquid.

Here, the liquid filter 1 also has a filter housing 10 comprising a screw cover 16 on the upper side and a ring filter insert 2 arranged inside the filter housing 10.

The inlet 11, which comes from the further component and which guides the liquid to be cleaned to the raw side 10.1, serves to supply liquid, which is to be filtered. During operating of the filter 1, the liquid flows through the filter material body 20 of the filter insert 2 and reaches the clean area 10.2. In response to a sufficient pressure of the liquid, the non-pressure check valve 17 opens and releases the return 12.

A seat 14, which interacts with a blocking element 24, which is embodied integrally here with the lower front panel 22 of the filter insert 2, is also arranged here in the outlet 13. An inclined plane 3, which is embodied on the outer circumference of a central pipe nozzle 15 and a nose 4, which interacts therewith, which is arranged on the inner circumference of the ring filter insert 2 in FIGS. 33 and 34 so as not to be visible, also serve here for a positionally accurate merging of blocking element 24 and seat 14.

The seat 14 is embodied here on the upper end of a pipe section 5, which is guided in the outlet 13 so as to be displaceable in axial direction. Here, the outlet 13 thereby encompasses three outlet sections 13.1, 13.2 and 13.3, which encompass different, decreasing diameters. The pipe section 5 is extended downwards by means of an appendage 50. A first, upper radial seal 51 is attached to the lower end of the pipe section 5 and a second, lower radial seal 52 is attached to the lower end of the appendage 50. The pipe section 5 is prestressed with a force, which points upwards, by means of a spring 53, which is supported on the filter housing 10.

In the normal operating state of the filter 1 shown in FIG. 33, the cover 16 is connected tightly to the filter housing 10 and the filter insert 2 assumes its lowest position in the filter housing 10. In this position, the cover 16 pushes the pipe section 15 downwards against the force of the spring 53 via the filter insert 2 and the blocking element 24 thereof. In this position of the pipe section 5, the upper radial seal 51 is located in the outlet section 13.2 so as to form a seal and the lower radial seal 52 is located in the lowermost outlet section 13.3 so as to form a seal. The outlet 13 is thus closed tightly. When liquid, which is to be filtered, is supplied through the inlet 11 under pressure, the liquid flows through the filter material body 20 and opens the non-pressure check valve 17 and flows off through the return 12. When no new liquid is supplied through the inlet 11, the non-pressure check valve 17 closes and prevents a draining of the filter housing 10.

Figure 34:
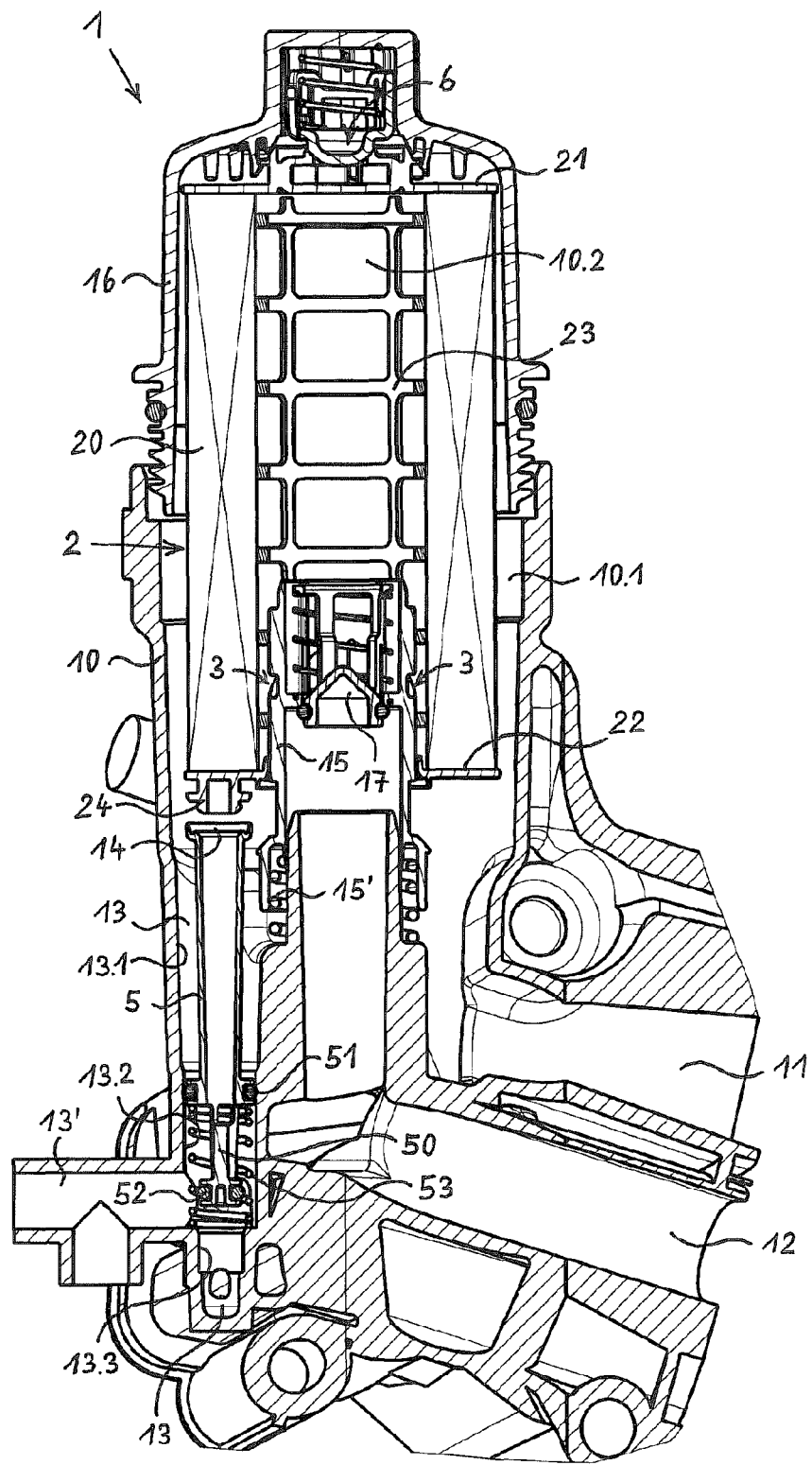

According to FIGS. 33 and 34, an outlet branch channel 13', which is locked tightly against the first outlet section 13.1 as well as against the third outlet section 13.3 in the position of the pipe section 5 according to FIG. 33, is connected to the central outlet section 13.2 facing to the left. During normal operation, liquid to be cooled flows through the outlet branch channel 13' from below through the connection illustrated there to the further component, which is not illustrated here, such as a heat exchanger, and reaches into the liquid filter 1 via the inlet 11 after flowing through said further component.

In the state according to FIG. 34, the screw cover 16 is released and the ring filter insert 2, which is locked with the screw cover 16, is lifted together with it. Through this, the blocking element 24 is released from the seat 14 on the upper end of the pipe section 5. At the same time, the pipe section 5 together with its appendage 50 is moved upwards by means of the force of the spring 53 to the extent that the lower radial seal 52 has now left the lower outlet section 13.3. In this manner, the filter housing 10 is emptied of liquid on the one hand and a draining of the further component via the outlet branch channel 13' into the outlet 13 is released on the other hand. When the ring filter insert 2 is removed out of the housing 10, not only the filter housing 10 is thus emptied of liquid, but the liquid is at the same time also drained out of the further component, such as a heat exchanger.

Figure 35:
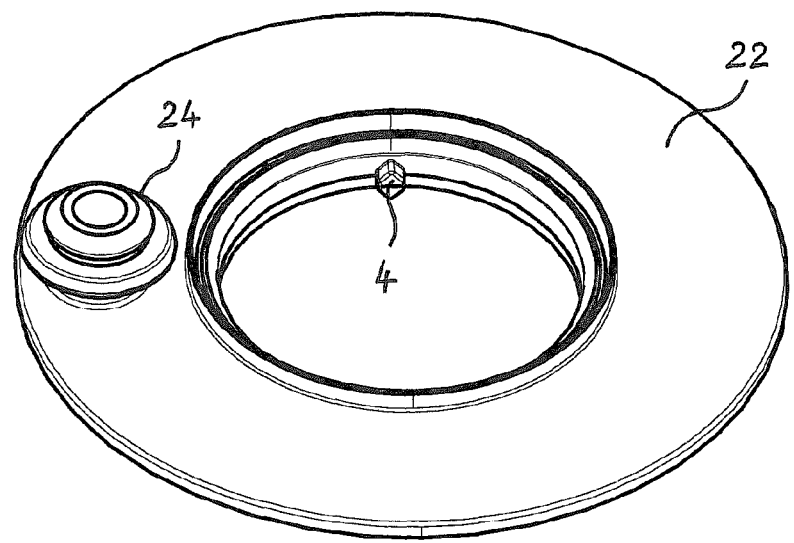

FIG. 35 shows the lower front panel 22 of the filter insert 2 of the liquid filter 1 according to FIGS. 33 and 34 as individual part in a perspective bottom view. The nose 4, which protrudes radially inward and which interacts with the inclined plane 3, which is provided on the central pipe nozzle 15 on the outer circumference thereof, is located in the central through hole of the front panel 22 at the inner circumference thereof in response to the installation of the ring filter insert 2 into the filter housing 10. On the left in FIG. 35, the integrally molded blocking element 24 is visible on the bottom side of the front panel 23, which faces the observer.

Figure 36:
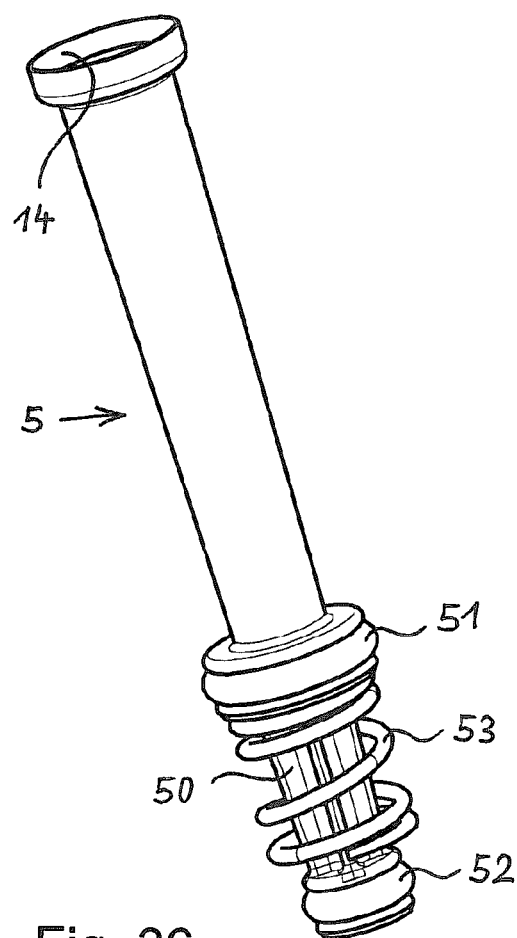

FIG. 36 shows the pipe section 5 from the liquid filter 1 according to FIGS. 33 and 34 as individual part in a view. The seat 14, which in the installed state of the ring filter insert 2 interacts with the blocking element 24 so as to form a seal, can be seen on the very top of the pipe section 5. On the lower end, the pipe section 5 continues in the appendage 50. The first upper radial seal 51 is arranged on the lower end of the pipe section 5. The second, lower radial sealing ring 52 is arranged on the lower end of the appendage 50, and the coil spring 53, the upper end of which is supported under the upper radial seal 51 on the pipe section 5, runs around the appendage 50.

Figure 37:
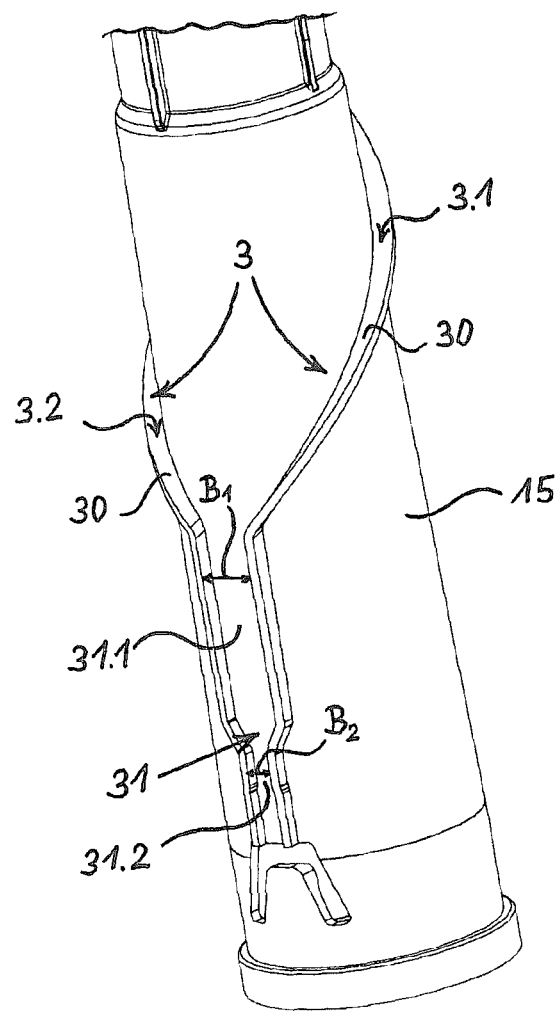
FIG. 37 shows a pipe nozzle comprising an inclined plane as individual part of the filter housing, in a view.

FIG. 37 finally shows only the pipe nozzle 15 as individual part in a changed embodiment, in a view onto its lower part. In the example according to FIG. 37, the inclined plane 3 also consists of the two partial planes 3.1 and 3.2, which run towards each other and which merge into an axial guide 31 at their lower end. The upper side of the partial planes 3.1 and 3.2 in each case form a contact surface 30 for the nose 4, which is integrally molded on the inner circumference of the filter insert 2, which is not illustrated here. When the filter insert 2 encompasses a rotational position, which does not match for the engagement of the blocking element 24 with the corresponding seat 14 in response to the installation of the filter insert 2, the nose 4 initially impacts the inclined plane 3, more accurately one of its partial planes 3.1 or 3.2. In response to a further downwards movement, the filter insert 2 is inevitably brought into the correct rotational position by means of nose 4, which slides on the inclined plane 3 or on one of the contact surfaces 30 thereof, respectively.

Here, the axial guide 31, which follows the inclined plane 3, has a first wider guide section 31.1, the width $B_1$ of which is at least 50% larger than the width of the corresponding nose 4. A second, narrower guide section 31.2 follows further downwards, the width $B_2$ of which corresponds to the width $B_N$ (see FIG. 26) of the corresponding nose 4 in addition to a mobility, which is required for a displacement of the nose 4 in the guide section 31.2 without jamming.

The axial guide 31 can widen slightly again at the very bottom, so as to compensate production tolerances and so as to allow for the blocking element 24 to enter into the corresponding seat 14 in a non-coerced manner in circumferential direction.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

List of Reference Numerals

| Numeral | Description |
|---|---|
| 1 | liquid filter |
| 10 | filter housing |
| 10.1 | raw side |
| 10.2 | clean side |
| 11 | inlet |
| 12 | return |
| 13 | outlet |
| 13.1-13.3 | outlet sections |
| 13' | outlet branch channel |
| 14 | seat |
| 14' | spring on 14 |
| 15 | pipe nozzle |
| 15' | spring on 15 |
| 16 | cover |
| 17 | non-pressure check valve |
| 18 | bottom of 10 |
| 2 | ring filter insert |
| 20 | filter material body |
| 21 | upper front panel |
| 22 | lower front panel |
| 23 | support dome in 2 |
| 24 | blocking element |
| 24' | spring arms |
| 25 | latching support |
| 3 | inclined plane |
| 3.1, 3.2 | partial planes |
| 30 | contact surface |
| 31 | axial guide |
| 31.1 | first guide section |
| 31.2 | second guide section |
| 4 | nose |
| 40 | sliding surfaces |
| 5 | pipe section |
| 50 | appendage |
| 51 | upper radial seal |
| 52 | lower radial seal |
| 53 | spring |
| 6 | filter circumventing valve |
| $B_1$ | width of 31.1 |
| $B_2$ | width of 31.2 |
| $B_N$ | width of 4 |

The invention claimed is:

1. A liquid filter, comprising:
a filter housing,
a ring filter insert, replaceably arranged in the filter housing, and
a removable cover arranged to close the filter housing during operation,
the filter housing including at least one inlet for raw liquid to be filtered, which inlet leads into a raw side of the filter housing, and
a return extending from a clean side of the filter housing for filtered clean liquid,
an eccentric opening arranged in a bottom of the filter housing,
the ring filter insert comprising a hollow-cylindrical filter material body, surrounded on front sides by top and bottom front panels, the ring filter insert separating the raw side of the filter housing and the clean side of the filter housing from each another,
an eccentric blocking element for the eccentric opening arranged on the bottom front panel,
first and second interacting positioning means each on one of the ring filter insert and the filter housing and arranged to bring the blocking element into engagement with the eccentric opening when the ring filter insert is inserted into the filter housing,
the first positioning means comprising an inclined plane,
the second positioning means comprising a protruding nose which is arranged opposite the inclined plane, and
the inclined plane and the nose arranged to be movable in relation to each other in such a way that they slide along each other and bring the blocking element into engagement with the eccentric opening, by rotating the ring filter insert relative to the filter housing,
the inclined plane being one of embodied and arranged on one of the inner circumference of the ring filter insert and the outer circumference of a filter housing part arranged inside the ring filter insert and the protruding nose being one of embodied and arranged on the other of the inner circumference of the ring filter insert and the outer circumference of the filter housing part,
the inclined plane comprising an incline which excludes a self-locking and
the eccentric opening being an outlet for emptying the filter housing when the filter insert is removed.

2. The liquid filter according to claim 1, wherein the inclined plane is formed by two partial planes which run towards each other in opposite directions and which in each case extend across half of one of an inner circumference of the ring filter insert and an outer circumference of the filter housing part arranged inside the ring filter insert.

3. The liquid filter according to claim 1, including a guide for the nose which runs in an axial direction and is connected to a lower end of the inclined plane.

4. The liquid filter according to claim 3, wherein, following the inclined plane, the guide for the nose, initially comprises a first guide section comprising a width which is at least 50% larger than a width of the nose and the first guide section merges into a following second guide section comprising a width which corresponds to the width of the nose, in addition to a mobility which is sufficient for a displacement of the nose in the second guide section without jamming.

5. The liquid filter according to claim 1, wherein the inclined plane is formed by one of a radially protruding rib and step, which forms a contact surface for the nose on one of an upper and lower side thereof.

6. The liquid filter according to claim 1, wherein the inclined plane is formed integrally with one of the filter housing and the ring filter insert.

7. The liquid filter according to claim 1, wherein the inclined plane is made as a separate part and is connected to one of the filter housing and the ring filter insert.

8. The liquid filter according to claim 1, wherein the nose is formed integrally with one of the filter housing and the ring filter insert.

9. The liquid filter according to claim 1, wherein the blocking element is one of a radially sealing valve element, an axially sealing valve element and a radially sealing plug which is one of rigidly connected to and rigidly arranged on the bottom front panel.

10. The liquid filter according to claim 1, wherein the blocking element is an axially sealing valve element which is elastically arranged on the bottom front panel.

11. The liquid filter according to claim 1, wherein the outlet comprises a seat which is one of incorporated on a side of the filter housing and is inserted as a separate part and which conforms to a shape of the blocking element.

12. The liquid filter according to claim 1, wherein the filter housing part arranged on the inside of the ring filter insert comprises a pipe nozzle which includes the return and which is one of rigidly connected to the remaining filter housing, integrally formed with the remaining filter housing and guided so as to be movable in the remaining filter housing in axial direction, and is prestressed with a spring force in the direction of the cover.

13. The liquid filter according to claim 12, wherein the pipe nozzle is one of connected to and embodied integrally with a seat which conforms to the blocking element and which is inserted into the outlet so as to be axially parallel to the pipe nozzle.

14. The liquid filter according to claim 1, wherein
the outlet, viewed in outlet direction, encompasses three outlet sections, a first section with a relatively large diameter, a second section with a relatively medium diameter and a third section with a relatively small diameter, wherein an outlet branch channel of a component, which is assigned to the liquid filter and which guides the same liquid, empties into the third outlet section with the relatively small diameter,
a pipe section is arranged in the outlet so as to be axially displaceable and so as to be prestressed with a spring force in a direction of the cover, wherein the pipe section supports a seat, which conforms to the blocking element, on its upper end and a first, upper radial seal on its lower end,
the pipe section encompasses an appendage, which extends axially downwards from its lower end and which supports a second, lower radial seal on its lower end, wherein the radial seals, being axially spaced apart from one another, interact with the second and third outlet sections so as to form a seal and wherein the lower radial seal is first transferred out of the third outlet section into the second outlet section, while the upper radial seal remains in the second outlet section, in response to an upwards movement of the pipe section from a lowermost base position when the cover is removed.

15. A ring filter insert for a liquid filter, comprising
a hollow-cylindrical filter material body surrounded on front sides by top and bottom front panels and which can be replaceably arranged in a filter housing,
an eccentric blocking element arranged on the bottom front panel for engaging an eccentric opening in the filter housing,
first positioning means on the ring filter insert, which interact with second positioning means on the filter housing when the ring filter insert is inserted into the filter housing and which are arranged to bring the blocking element into engagement with the eccentric opening,
the first positioning means being one of an inclined plane and a protruding nose, with the second positioning means being the other of the inclined plane and the protruding nose,
the inclined plane and the nose arranged to be moved in relation to each other in such a way that they slide along each other and bring the blocking element into engagement with the eccentric opening, by rotating the ring filter insert relative to the filter housing,
the first positioning means being one of embodied and arranged on an inner circumference of the ring filter insert.

16. The ring filter insert according to claim 15, wherein the inclined plane is formed by two partial planes which run towards each other in opposite directions and which in each case extend across half of an inner circumference of the ring filter insert.

17. The ring filter insert according to claim 15, including a guide for the nose which runs in an axial direction and is connected to a lower end of the inclined plane.

18. The ring filter insert according to claim 17, wherein following the inclined plane, the guide for the nose initially comprises a first guide section comprising a width which is at least 50% larger than the width of the nose and the first guide section merges into a following second guide section comprising a width which corresponds to the width of the nose, in addition to a mobility which is sufficient for a displacement of the nose in the second guide section without jamming.

19. The ring filter insert according to claim 15, wherein the inclined plane is formed by one of a radially protruding rib and step which forms a contact surface for the nose on one of an upper or lower side thereof.

20. The ring filter insert according to claim 15 wherein the inclined plane is formed integrally with the ring filter insert.

21. The ring filter insert according to claim 15, wherein the inclined plane is made as a separate part and is connected to the ring filter insert.

22. The ring filter insert according to claim 15, including a support structure arranged in the interior of the ring filter insert with the inclined plane being arranged on the support structure.

23. The ring filter insert according to claim 15, wherein the nose is formed integrally with the bottom front panel of the ring filter insert.

24. The ring filter insert according to claim 15, wherein the blocking element is one of a radially sealing valve element, an axially sealing valve element, and a radially sealing plug which is one of rigidly connected to the lower front panel and rigidly arranged on the lower front panel.

25. The ring filter insert according to claim 15, wherein the blocking element is an axially sealing valve element which is elastically arranged on the bottom front panel.

26. The ring filter insert according to claim 25, wherein two spring arms are formed integrally with the front panel, which spring arms carry the blocking element resiliently in an axial direction.

27. The ring filter insert according to claim 25, wherein the blocking element carried by the spring arms is connected to the remaining front panel by a snap-on carrier.

28. The ring filter insert according to claim 15, wherein the blocking element is formed from two parts, the two parts of the blocking element being engaged with each other in a manner allowing a compensation of radial dimension tolerances and angle errors.

29. The liquid filter according to claim 1, wherein the protruding nose protrudes radially.

30. The ring filter insert according to claim 15, wherein the protruding nose protrudes radially.

* * * * *